United States Patent
Heng et al.

(10) Patent No.: US 9,161,060 B2
(45) Date of Patent: Oct. 13, 2015

(54) MULTI-MODE ERROR CONCEALMENT, RECOVERY AND RESILIENCE CODING

(75) Inventors: Brian Heng, Irvine, CA (US); Wade K. Wan, Orange, CA (US); Zhijie Yang, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 817 days.

(21) Appl. No.: 13/333,135

(22) Filed: Dec. 21, 2011

(65) Prior Publication Data

US 2013/0083837 A1      Apr. 4, 2013

Related U.S. Application Data

(60) Provisional application No. 61/541,938, filed on Sep. 30, 2011.

(51) Int. Cl.
| | |
|---|---|
| *H04N 7/12* | (2006.01) |
| *H04L 1/00* | (2006.01) |
| *H04L 5/00* | (2006.01) |
| *H04N 19/895* | (2014.01) |
| *H04N 19/30* | (2014.01) |
| *H04N 19/103* | (2014.01) |
| *H04N 19/164* | (2014.01) |
| *H04N 19/86* | (2014.01) |
| *H04N 19/40* | (2014.01) |

(52) U.S. Cl.
CPC .......... *H04N 19/895* (2014.11); *H04N 19/103* (2014.11); *H04N 19/164* (2014.11); *H04N 19/30* (2014.11); *H04N 19/40* (2014.11); *H04N 19/86* (2014.11)

(58) Field of Classification Search
None
See application file for complete search history.

(56) References Cited

U.S. PATENT DOCUMENTS

2002/0118750 A1 *   8/2002   Yagasaki et al. .......... 375/240.11

* cited by examiner

*Primary Examiner* — Joseph Ustaris
*Assistant Examiner* — Maryam Nasri
(74) *Attorney, Agent, or Firm* — Garlick & Markison; Shayne X. Short

(57) ABSTRACT

Multi-mode error concealment, recovery and resilience coding. Adaptation of a number of coding units (CUs) employed in accordance with video coding may be made as a function of error. As a number of errors increases, the respective number of CUs may correspondingly increase (e.g., which may be made in accompaniment with a reduction of CU size). As a number of errors decreases, the respective number of CUs may correspondingly decrease (e.g., which may be made in accompaniment with an increase of CU size). Such errors may be associated with a type of source providing a video signal, a type of error resilience coding employed, communication link and/or channel conditions, a remote error characteristic (e.g., such as associated with a source device and/or destination device), a local error characteristic (e.g., such as associated with operations and/or processing within a given device), and/or any other type of consideration.

20 Claims, 22 Drawing Sheets

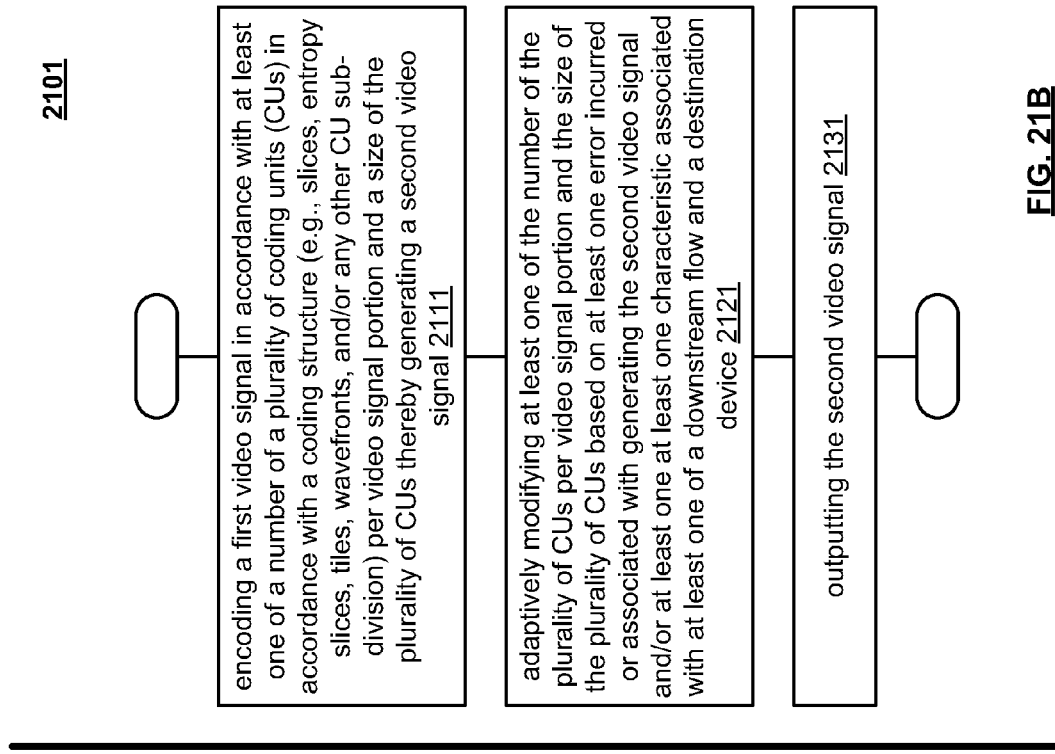

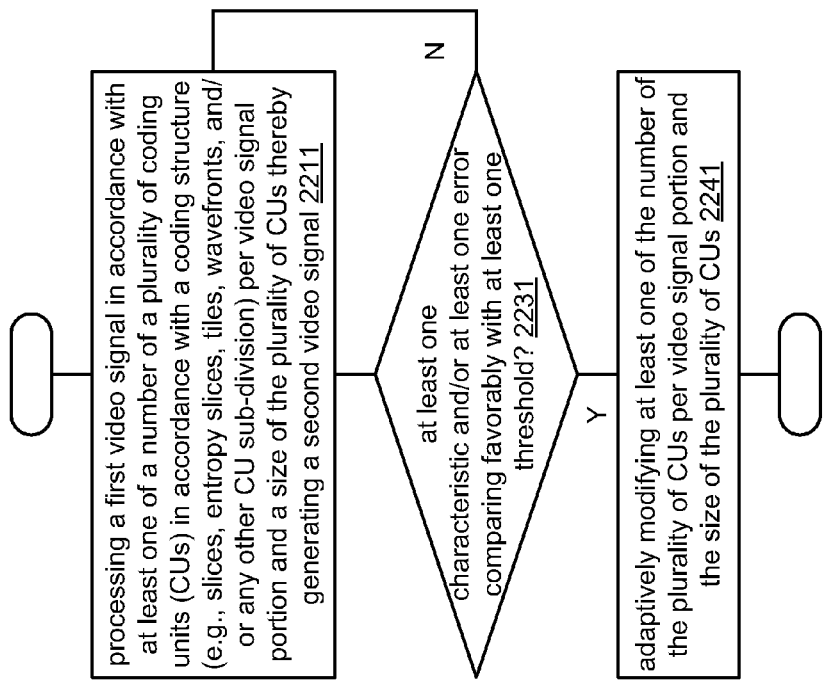
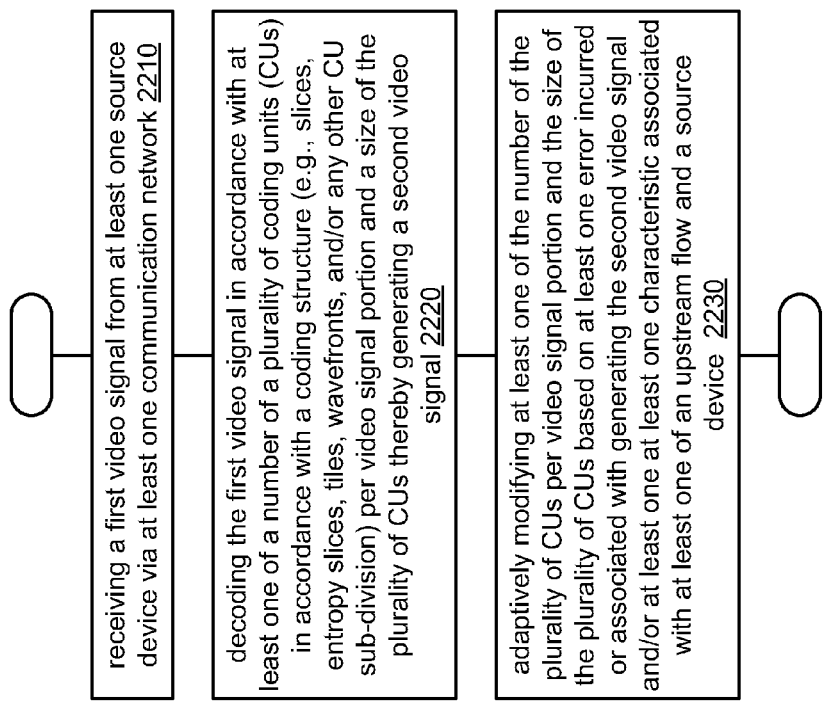

MULTI-MODE ERROR CONCEALMENT, RECOVERY AND RESILIENCE CODING

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Application which is hereby incorporated herein by reference in its entirety and made part of the present U.S. Utility patent application for all purposes:

1. U.S. Provisional Patent Application Ser. No. 61/541,938, entitled "Coding, communications, and signaling of video content within communication systems," filed Sep. 30, 2011.

Incorporation by Reference

The following standards/draft standards are hereby incorporated herein by reference in their entirety and are made part of the present U.S. Utility Patent Application for all purposes:

1. "WD4: Working Draft 4 of High-Efficiency Video Coding, Joint Collaborative Team on Video Coding (JCT-VC)," Joint Collaborative Team on Video Coding (JCT-VC) of ITU-T SG16 WP3 and ISO/IEC JTC1/SC29/WG11 6th Meeting: Torino, IT, 14-22 Jul., 2011, Document: JCTVC-F803 d4, 230 pages.

2. International Telecommunication Union, ITU-T, TELECOMMUNICATION STANDARDIZATION SECTOR OF ITU, H.264 (March 2010), SERIES H: AUDIOVISUAL AND MULTIMEDIA SYSTEMS, Infrastructure of audiovisual services—Coding of moving video, Advanced video coding for generic audiovisual services, Recommendation ITU-T H.264, also alternatively referred to as International Telecomm ISO/IEC 14496-10—MPEG-4 Part 10, AVC (Advanced Video Coding), H.264/MPEG-4 Part 10 or AVC (Advanced Video Coding), ITU H.264/MPEG4-AVC, or equivalent.

BACKGROUND OF THE INVENTION

1. Technical Field of the Invention

The invention relates generally to digital video processing; and, more particularly, it relates to video signal processing using various respective coding structures (e.g., having any desired coding unit (CU) sizes) in accordance with such digital video processing.

2. Description of Related Art

Communication systems that operate to communicate digital media (e.g., images, video, data, etc.) have been under continual development for many years. With respect to such communication systems employing some form of video data, a number of digital images are output or displayed at some frame rate (e.g., frames per second) to effectuate a video signal suitable for output and consumption. Within many such communication systems operating using video data, there can be a trade-off between throughput (e.g., number of image frames that may be transmitted from a first location to a second location) and video and/or image quality of the signal eventually to be output or displayed. The present art does not adequately or acceptably provide a means by which video data may be transmitted from a first location to a second location in accordance with providing an adequate or acceptable video and/or image quality, ensuring a relatively low amount of overhead associated with the communications, relatively low complexity of the communication devices at respective ends of communication links, etc.

BRIEF DESCRIPTION OF THE SEVERAL VIEWS OF THE DRAWINGS

FIG. 21A, FIG. 21B, FIG. 22A, and FIG. 22B illustrate various embodiments of methods for processing of one or more video signals.

DETAILED DESCRIPTION OF THE INVENTION

Within many devices that use digital media such as digital video, respective images thereof, being digital in nature, are represented using pixels. Within certain communication systems, digital media can be transmitted from a first location to a second location at which such media can be output or displayed. The goal of digital communications systems, including those that operate to communicate digital video, is to transmit digital data from one location, or subsystem, to another either error free or with an acceptably low error rate.

Figure 1:
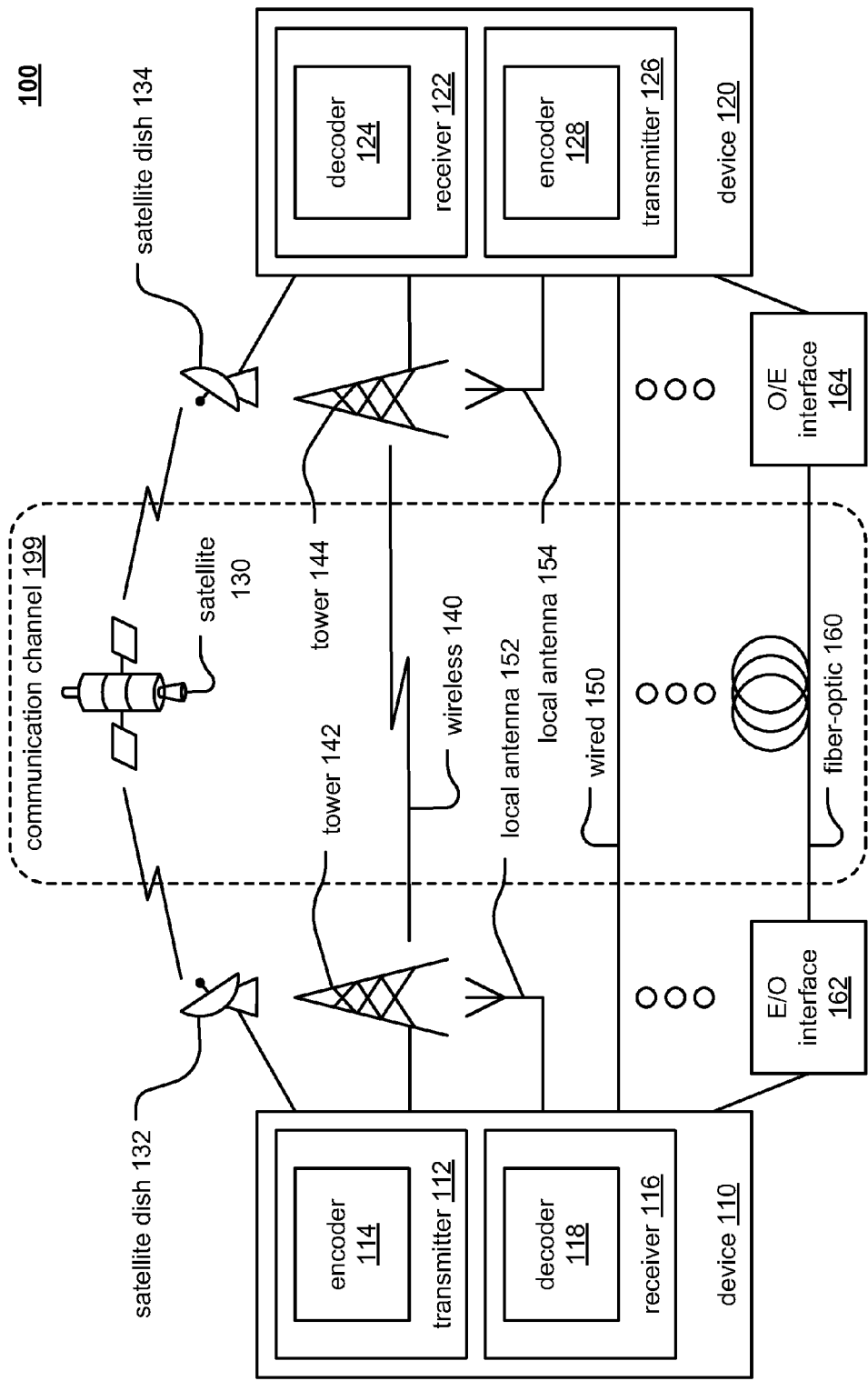
FIG. 1 and FIG. 2 illustrate various embodiments of communication systems.

As shown in FIG. 1, data may be transmitted over a variety of communications channels in a wide variety of communication systems: magnetic media, wired, wireless, fiber, copper, and/or other types of media as well.

Figure 2:
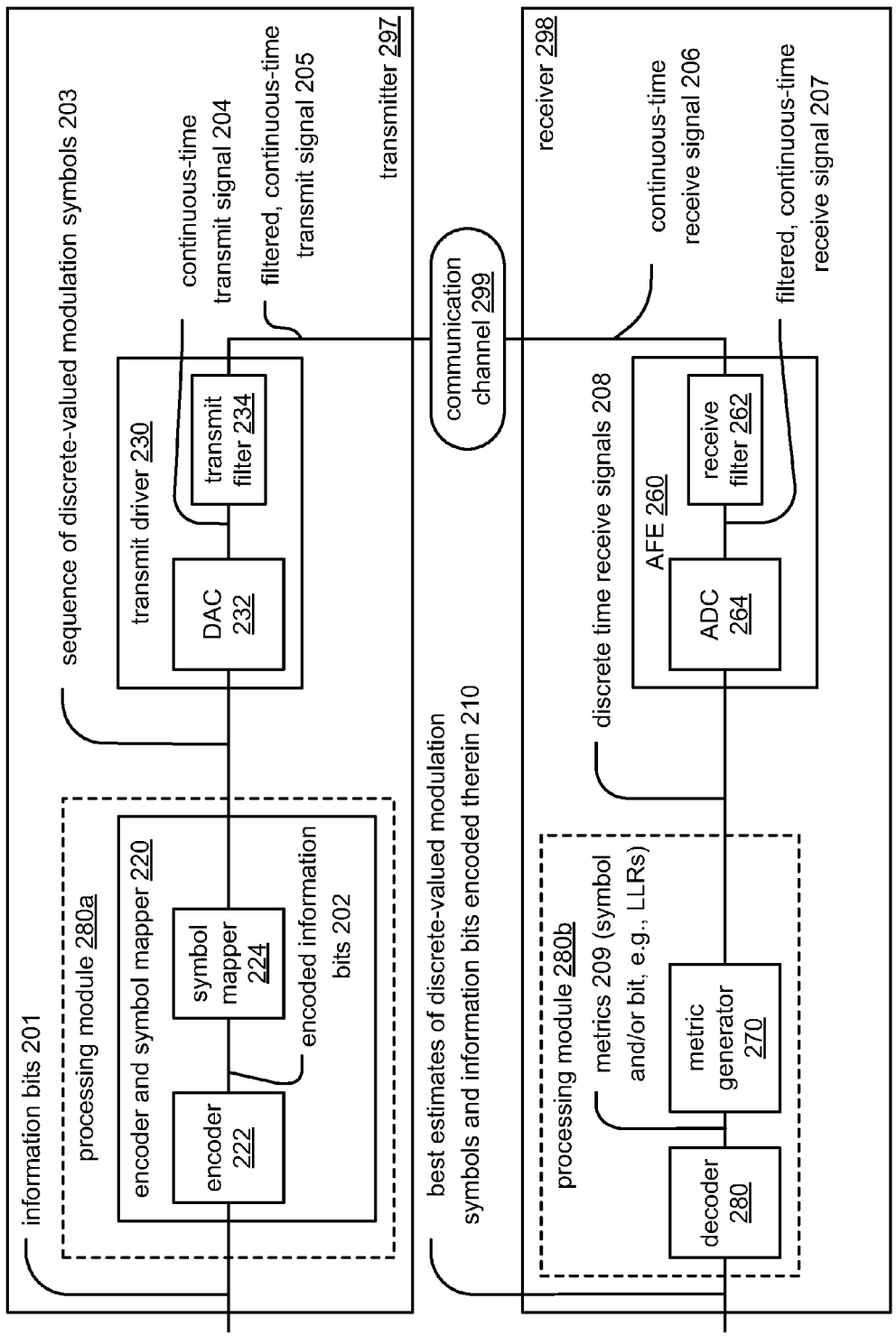

FIG. 1 and FIG. 2 are diagrams illustrate various embodiments of communication systems, 100 and 200, respectively.

Referring to FIG. 1, this embodiment of a communication system 100 is a communication channel 199 that communicatively couples a communication device 110 (including a transmitter 112 having an encoder 114 and including a receiver 116 having a decoder 118) situated at one end of the communication channel 199 to another communication device 120 (including a transmitter 126 having an encoder 128 and including a receiver 122 having a decoder 124) at the other end of the communication channel 199. In some embodiments, either of the communication devices 110 and 120 may only include a transmitter or a receiver. There are several different types of media by which the communication channel 199 may be implemented (e.g., a satellite communication channel 130 using satellite dishes 132 and 134, a wireless communication channel 140 using towers 142 and 144 and/or local antennae 152 and 154, a wired communication channel 150, and/or a fiber-optic communication channel 160 using electrical to optical (E/O) interface 162 and optical to electrical (O/E) interface 164)). In addition, more than one type of media may be implemented and interfaced together thereby forming the communication channel 199.

It is noted that such communication devices 110 and/or 120 may be stationary or mobile without departing from the scope and spirit of the invention. For example, either one or both of the communication devices 110 and 120 may be implemented in a fixed location or may be a mobile communication device with capability to associate with and/or communicate with more than one network access point (e.g., different respective access points (APs) in the context of a mobile communication system including one or more wireless local area networks (WLANs), different respective satellites in the context of a mobile communication system including one or more satellite, or generally, different respective network access points in the context of a mobile communication system including one or more network access points by which communications may be effectuated with communication devices 110 and/or 120.

To reduce transmission errors that may undesirably be incurred within a communication system, error correction and channel coding schemes are often employed. Generally, these error correction and channel coding schemes involve the use of an encoder at the transmitter end of the communication channel 199 and a decoder at the receiver end of the communication channel 199.

Any of various types of ECC codes described can be employed within any such desired communication system (e.g., including those variations described with respect to FIG. 1), any information storage device (e.g., hard disk drives (HDDs), network information storage devices and/or servers, etc.) or any application in which information encoding and/or decoding is desired.

Generally speaking, when considering a communication system in which video data is communicated from one location, or subsystem, to another, video data encoding may generally be viewed as being performed at a transmitting end of the communication channel 199, and video data decoding may generally be viewed as being performed at a receiving end of the communication channel 199.

Also, while the embodiment of this diagram shows bi-directional communication being capable between the communication devices 110 and 120, it is of course noted that, in some embodiments, the communication device 110 may include only video data encoding capability, and the communication device 120 may include only video data decoding capability, or vice versa (e.g., in a uni-directional communication embodiment such as in accordance with a video broadcast embodiment).

Referring to the communication system 200 of FIG. 2, at a transmitting end of a communication channel 299, information bits 201 (e.g., corresponding particularly to video data in one embodiment) are provided to a transmitter 297 that is operable to perform encoding of these information bits 201 using an encoder and symbol mapper 220 (which may be viewed as being distinct elements, namely, encoder 222 and and symbol mapper 224 such that the encoder 222 generates encoded information bits 202 that get provided to the symbol mapper 224) thereby generating a sequence of discrete-valued modulation symbols 203 that is provided to a transmit driver 230 that uses a DAC (Digital to Analog Converter) 232 to generate a continuous-time transmit signal 204 and a transmit filter 234 to generate a filtered, continuous-time transmit signal 205 that substantially comports with the communication channel 299. At a receiving end of the communication channel 299, continuous-time receive signal 206 is provided to an AFE (Analog Front End) 260 that includes a receive filter 262 (that generates a filtered, continuous-time receive signal 207) and an ADC (Analog to Digital Converter) 264 (that generates discrete-time receive signals 208). A metric generator 270 calculates metrics 209 (e.g., on either a symbol and/or bit basis) that are employed by a decoder 280 to make best estimates of the discrete-valued modulation symbols and information bits encoded therein 210.

Within each of the transmitter 297 and the receiver 298, any desired integration of various components, blocks, functional blocks, circuitries, etc. Therein may be implemented. For example, this diagram shows a processing module 280a as including the encoder and symbol mapper 220 (and/or the encoder 222 and the symbol mapper 224) and all associated, corresponding components therein, and a decoder module 280 is shown as including the metric generator 270 and the decoder 280 and all associated, corresponding components therein. Such processing modules 280a and 280b may be respective integrated circuits. Of course, other boundaries and groupings may alternatively be performed without departing from the scope and spirit of the invention. For example, all components within the transmitter 297 may be included within a first processing module or integrated circuit, and all components within the receiver 298 may be included within a second processing module or integrated circuit. Alternatively, any other combination of components within each of the transmitter 297 and the receiver 298 may be made in other embodiments.

As with the previous embodiment, such a communication system 200 may be employed for the communication of video data is communicated from one location, or subsystem, to another (e.g., from transmitter 297 to the receiver 298 via the communication channel 299).

Digital image and/or video processing of digital images and/or media (including the respective images within a digital video signal) may be performed by any of the various devices depicted below in FIG. 3A-3H to allow a user to view such digital images and/or video. These various devices do not include an exhaustive list of devices in which the image and/or video processing described herein may be effectuated, and it is noted that any generic digital image and/or video processing device may be implemented to perform the processing described herein without departing from the scope and spirit of the invention.

Figure 3:
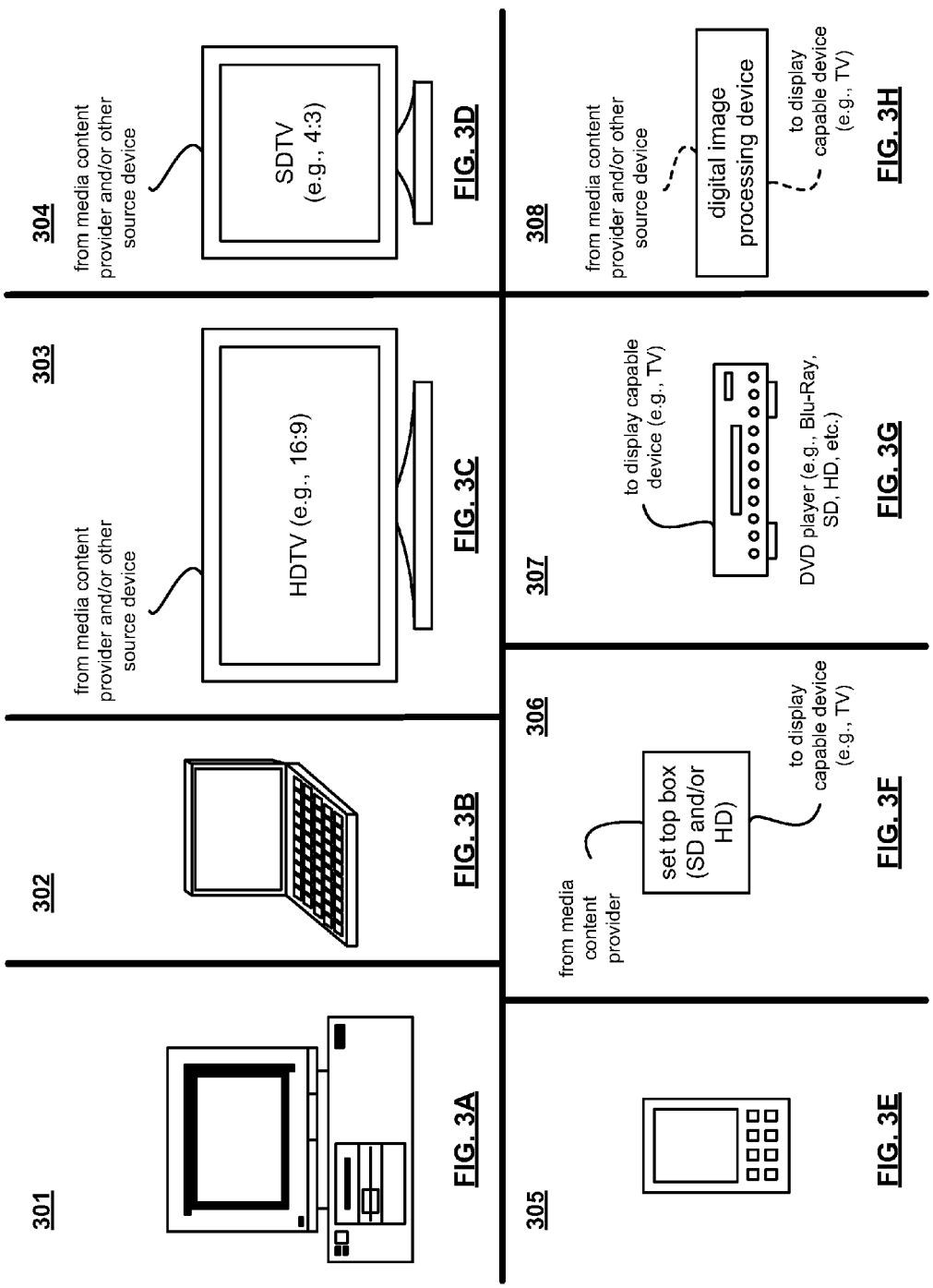
FIG. 3A illustrates an embodiment of a computer.
FIG. 3B illustrates an embodiment of a laptop computer.
FIG. 3C illustrates an embodiment of a high definition (HD) television.
FIG. 3D illustrates an embodiment of a standard definition (SD) television.
FIG. 3E illustrates an embodiment of a handheld media unit.
FIG. 3F illustrates an embodiment of a set top box (STB).
FIG. 3G illustrates an embodiment of a digital video disc (DVD) player.
FIG. 3H illustrates an embodiment of a generic digital image and/or video processing device.

FIG. 3A illustrates an embodiment of a computer 301. The computer 301 can be a desktop computer, or an enterprise storage devices such a server, of a host computer that is attached to a storage array such as a redundant array of independent disks (RAID) array, storage router, edge router, storage switch and/or storage director. A user is able to view still digital images and/or video (e.g., a sequence of digital images) using the computer 301. Oftentimes, various image and/or video viewing programs and/or media player programs are included on a computer 301 to allow a user to view such images (including video).

FIG. 3B illustrates an embodiment of a laptop computer 302. Such a laptop computer 302 may be found and used in any of a wide variety of contexts. In recent years, with the ever-increasing processing capability and functionality found within laptop computers, they are being employed in many instances where previously higher-end and more capable desktop computers would be used. As with the computer 301, the laptop computer 302 may include various image viewing programs and/or media player programs to allow a user to view such images (including video).

FIG. 3C illustrates an embodiment of a high definition (HD) television 303. Many HD televisions 303 include an integrated tuner to allow the receipt, processing, and decoding of media content (e.g., television broadcast signals) thereon. Alternatively, sometimes an HD television 303 receives media content from another source such as a digital video disc (DVD) player, set top box (STB) that receives, processes, and decodes a cable and/or satellite television broadcast signal. Regardless of the particular implementation, the HD television 303 may be implemented to perform image and/or video processing as described herein. Generally speaking, an HD television 303 has capability to display HD media content and oftentimes is implemented having a 16:9 widescreen aspect ratio.

FIG. 3D illustrates an embodiment of a standard definition (SD) television 304. Of course, an SD television 304 is somewhat analogous to an HD television 303, with at least one difference being that the SD television 304 does not include capability to display HD media content, and an SD television 304 oftentimes is implemented having a 4:3 full screen aspect ratio. Nonetheless, even an SD television 304 may be implemented to perform image and/or video processing as described herein.

FIG. 3E illustrates an embodiment of a handheld media unit 305. A handheld media unit 305 may operate to provide general storage or storage of image/video content information such as joint photographic experts group (JPEG) files, tagged image file format (TIFF), bitmap, motion picture experts group (MPEG) files, Windows Media (WMA/WMV) files, other types of video content such as MPEG4 files, etc. for playback to a user, and/or any other type of information that may be stored in a digital format. Historically, such handheld media units were primarily employed for storage and playback of audio media; however, such a handheld media unit 305 may be employed for storage and playback of virtual any media (e.g., audio media, video media, photographic media, etc.). Moreover, such a handheld media unit 305 may also include other functionality such as integrated communication circuitry for wired and wireless communications. Such a handheld media unit 305 may be implemented to perform image and/or video processing as described herein.

FIG. 3F illustrates an embodiment of a set top box (STB) 306. As mentioned above, sometimes a STB 306 may be implemented to receive, process, and decode a cable and/or satellite television broadcast signal to be provided to any appropriate display capable device such as SD television 304 and/or HD television 303. Such an STB 306 may operate independently or cooperatively with such a display capable device to perform image and/or video processing as described herein.

FIG. 3G illustrates an embodiment of a digital video disc (DVD) player 307. Such a DVD player may be a Blu-Ray DVD player, an HD capable DVD player, an SD capable DVD player, an up-sampling capable DVD player (e.g., from SD to HD, etc.) without departing from the scope and spirit of the invention. The DVD player may provide a signal to any appropriate display capable device such as SD television 304 and/or HD television 303. The DVD player 307 may be implemented to perform image and/or video processing as described herein.

FIG. 3H illustrates an embodiment of a generic digital image and/or video processing device 308. Again, as mentioned above, these various devices described above do not include an exhaustive list of devices in which the image and/or video processing described herein may be effectuated, and it is noted that any generic digital image and/or video processing device 308 may be implemented to perform the image and/or video processing described herein without departing from the scope and spirit of the invention.

Figure 4:
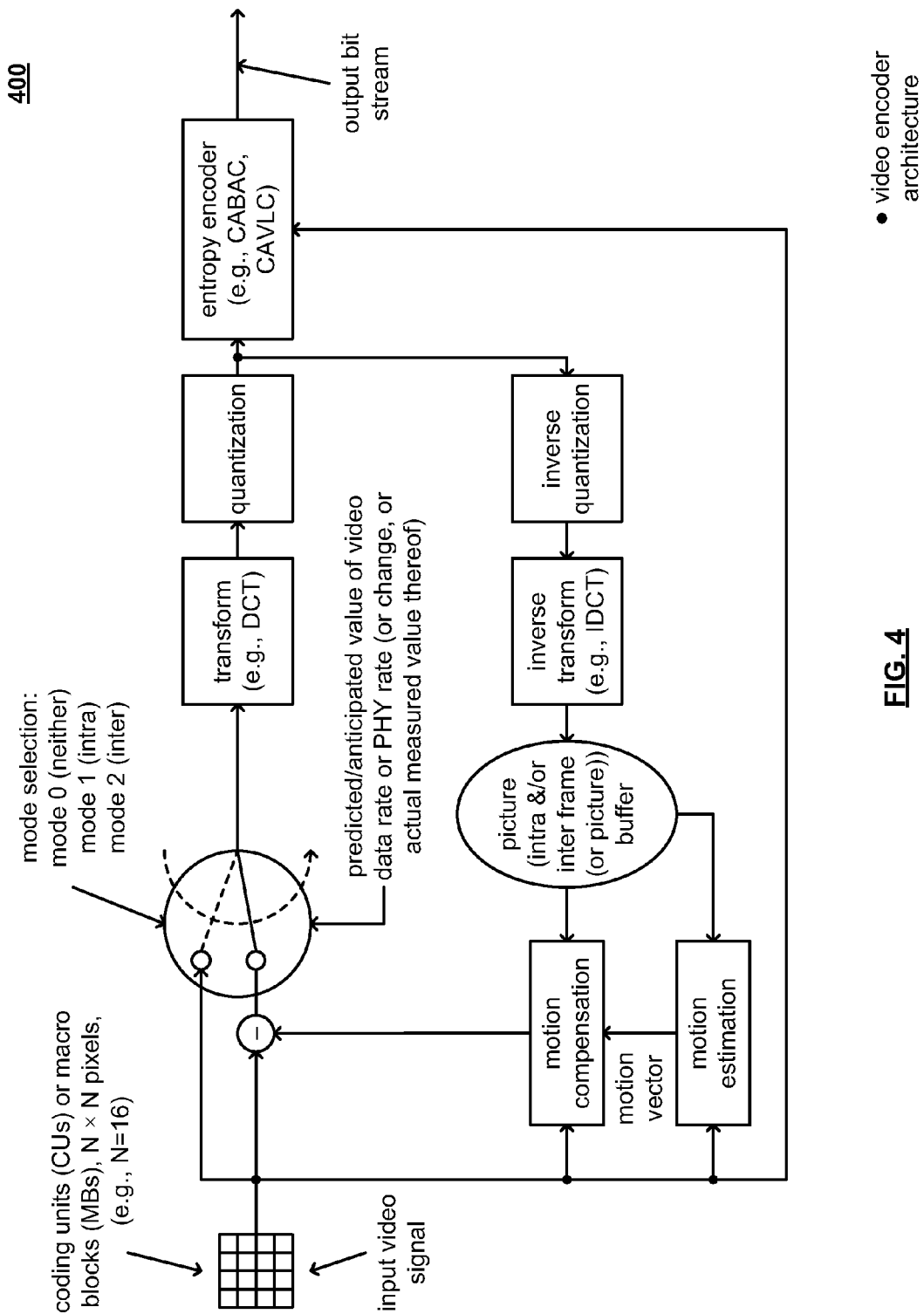
FIG. 4, FIG. 5, and FIG. 6 are diagrams illustrating various embodiments of video encoding architectures.
Figure 5:
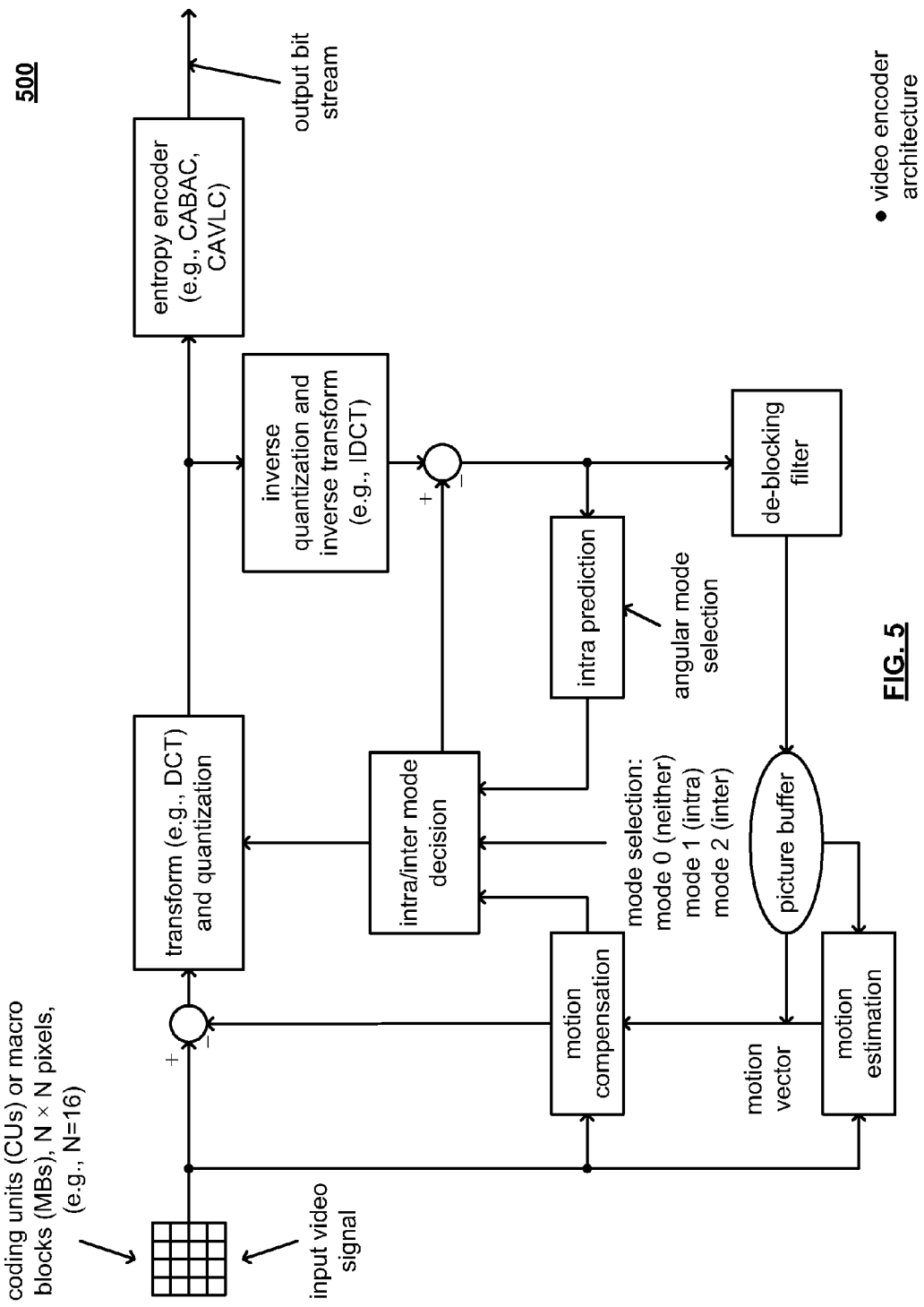
Figure 6:
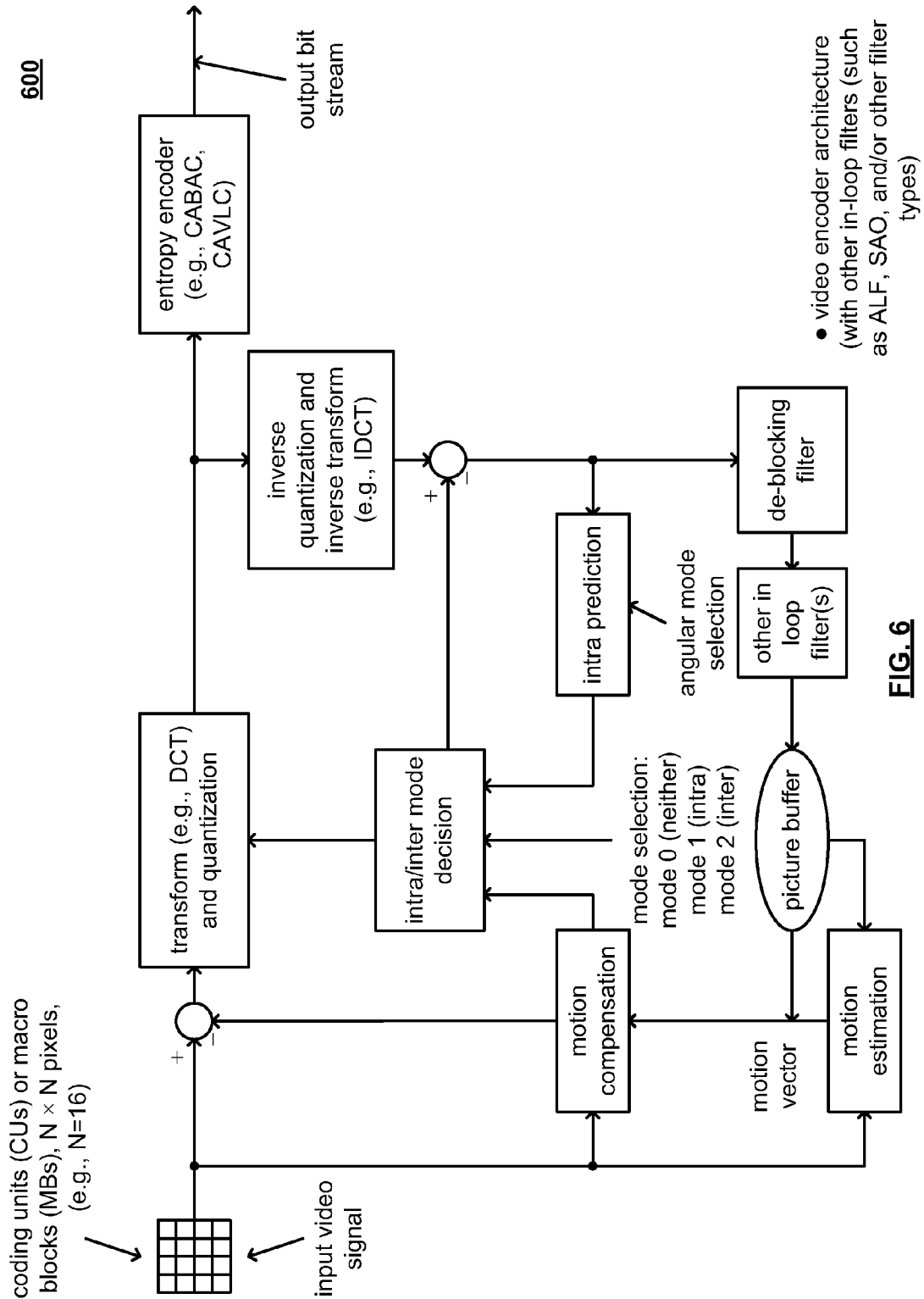

FIG. 4, FIG. 5, and FIG. 6 are diagrams illustrating various embodiments 400 and 500, and 600, respectively, of video encoding architectures.

Referring to embodiment 400 of FIG. 4, as may be seen with respect to this diagram, an input video signal is received by a video encoder. In certain embodiments, the input video signal is composed of coding units (CUs) or macro-blocks (MBs). The size of such coding units or macro-blocks may be varied and can include a number of pixels typically arranged in a square shape. In one embodiment, such coding units or macro-blocks have a size of 16×16 pixels. However, it is generally noted that a macro-block may have any desired size such as N×N pixels, where N is an integer. Of course, some implementations may include non-square shaped coding units or macro-blocks, although square shaped coding units or macro-blocks are employed in a preferred embodiment.

The input video signal may generally be referred to as corresponding to raw frame (or picture) image data. For example, raw frame (or picture) image data may undergo processing to generate luma and chroma samples. In some embodiments, the set of luma samples in a macro-block is of one particular arrangement (e.g., 16×16), and set of chroma samples is of a different particular arrangement (e.g., 8×8). In accordance with the embodiment depicted herein, a video encoder processes such samples on a block by block basis.

The input video signal then undergoes mode selection by which the input video signal selectively undergoes intra and/or inter-prediction processing. Generally speaking, the input video signal undergoes compression along a compression pathway. When operating with no feedback (e.g., in accordance with neither inter-prediction nor intra-prediction), the input video signal is provided via the compression pathway to undergo transform operations (e.g., in accordance with discrete cosine transform (DCT)). Of course, other transforms may be employed in alternative embodiments. In this mode of operation, the input video signal itself is that which is compressed. The compression pathway may take advantage of the lack of high frequency sensitivity of human eyes in performing the compression.

However, feedback may be employed along the compression pathway by selectively using inter- or intra-prediction video encoding. In accordance with a feedback or predictive mode of operation, the compression pathway operates on a (relatively low energy) residual (e.g., a difference) resulting from subtraction of a predicted value of a current macro-block from the current macro-block. Depending upon which form of prediction is employed in a given instance, a residual or difference between a current macro-block and a predicted value of that macro-block based on at least a portion of that same frame (or picture) or on at least a portion of at least one other frame (or picture) is generated.

The resulting modified video signal then undergoes transform operations along the compression pathway. In one embodiment, a discrete cosine transform (DCT) operates on a set of video samples (e.g., luma, chroma, residual, etc.) to compute respective coefficient values for each of a predetermined number of basis patterns. For example, one embodiment includes 64 basis functions (e.g., such as for an 8×8 sample). Generally speaking, different embodiments may employ different numbers of basis functions (e.g., different transforms). Any combination of those respective basis functions, including appropriate and selective weighting thereof, may be used to represent a given set of video samples. Additional details related to various ways of performing transform operations are described in the technical literature associated with video encoding including those standards/draft standards that have been incorporated by reference as indicated above. The output from the transform processing includes such respective coefficient values. This output is provided to a quantizer.

Generally, most image blocks will typically yield coefficients (e.g., DCT coefficients in an embodiment operating in accordance with discrete cosine transform (DCT)) such that the most relevant DCT coefficients are of lower frequencies. Because of this and of the human eyes' relatively poor sensitivity to high frequency visual effects, a quantizer may be operable to convert most of the less relevant coefficients to a value of zero. That is to say, those coefficients whose relative contribution is below some predetermined value (e.g., some threshold) may be eliminated in accordance with the quantization process. A quantizer may also be operable to convert the significant coefficients into values that can be coded more efficiently than those that result from the transform process. For example, the quantization process may operate by dividing each respective coefficient by an integer value and discarding any remainder. Such a process, when operating on typical coding units or macro-blocks, typically yields a relatively low number of non-zero coefficients which are then delivered to an entropy encoder for lossless encoding and for use in accordance with a feedback path which may select intra-prediction and/or inter-prediction processing in accordance with video encoding.

An entropy encoder operates in accordance with a lossless compression encoding process. In comparison, the quantization operations are generally lossy. The entropy encoding process operates on the coefficients provided from the quantization process. Those coefficients may represent various characteristics (e.g., luma, chroma, residual, etc.). Various types of encoding may be employed by an entropy encoder. For example, context-adaptive binary arithmetic coding (CABAC) and/or context-adaptive variable-length coding (CAVLC) may be performed by the entropy encoder. For example, in accordance with at least one part of an entropy coding scheme, the data is converted to a (run, level) pairing (e.g., data 14, 3, 0, 4, 0, 0, −3 would be converted to the respective (run, level) pairs of (0, 14), (0, 3), (1, 4), (2,−3)). In advance, a table may be prepared that assigns variable length codes for value pairs, such that relatively shorter length codes are assigned to relatively common value pairs, and relatively longer length codes are assigned for relatively less common value pairs.

As the reader will understand, the operations of inverse quantization and inverse transform correspond to those of quantization and transform, respectively. For example, in an embodiment in which a DCT is employed within the transform operations, then an inverse DCT (IDCT) is that employed within the inverse transform operations.

A picture buffer, alternatively referred to as a digital picture buffer or a DPB, receives the signal from the IDCT module; the picture buffer is operative to store the current frame (or picture) and/or one or more other frames (or pictures) such as may be used in accordance with intra-prediction and/or inter-prediction operations as may be performed in accordance with video encoding. It is noted that in accordance with intra-prediction, a relatively small amount of storage may be sufficient, in that, it may not be necessary to store the current frame (or picture) or any other frame (or picture) within the frame (or picture) sequence. Such stored information may be employed for performing motion compensation and/or motion estimation in the case of performing inter-prediction in accordance with video encoding.

In one possible embodiment, for motion estimation, a respective set of luma samples (e.g., 16×16) from a current frame (or picture) are compared to respective buffered counterparts in other frames (or pictures) within the frame (or picture) sequence (e.g., in accordance with inter-prediction). In one possible implementation, a closest matching area is located (e.g., prediction reference) and a vector offset (e.g., motion vector) is produced. In a single frame (or picture), a number of motion vectors may be found and not all will necessarily point in the same direction. One or more operations as performed in accordance with motion estimation are operative to generate one or more motion vectors.

Motion compensation is operative to employ one or more motion vectors as may be generated in accordance with motion estimation. A prediction reference set of samples is identified and delivered for subtraction from the original input video signal in an effort hopefully to yield a relatively (e.g., ideally, much) lower energy residual. If such operations do not result in a yielded lower energy residual, motion compensation need not necessarily be performed and the transform operations may merely operate on the original input video signal instead of on a residual (e.g., in accordance with an operational mode in which the input video signal is provided straight through to the transform operation, such that neither intra-prediction nor inter-prediction are performed), or intra-prediction may be utilized and transform operations performed on the residual resulting from intra-prediction. Also, if the motion estimation and/or motion compensation operations are successful, the motion vector may also be sent to the entropy encoder along with the corresponding residual's coefficients for use in undergoing lossless entropy encoding.

The output from the overall video encoding operation is an output bit stream. It is noted that such an output bit stream may of course undergo certain processing in accordance with generating a continuous time signal which may be transmitted via a communication channel. For example, certain embodiments operate within wireless communication systems. In such an instance, an output bitstream may undergo appropriate digital to analog conversion, frequency conversion, scaling, filtering, modulation, symbol mapping, and/or any other operations within a wireless communication device that operate to generate a continuous time signal capable of being transmitted via a communication channel, etc.

Referring to embodiment 500 of FIG. 5, as may be seen with respect to this diagram, an input video signal is received by a video encoder. In certain embodiments, the input video signal is composed of coding units or macro-blocks (and/or may be partitioned into coding units (CUs)). The size of such coding units or macro-blocks may be varied and can include a number of pixels typically arranged in a square shape. In one embodiment, such coding units or macro-blocks have a size of 16×16 pixels. However, it is generally noted that a macro-block may have any desired size such as N×N pixels, where N is an integer. Of course, some implementations may include non-square shaped coding units or macro-blocks, although square shaped coding units or macro-blocks are employed in a preferred embodiment.

The input video signal may generally be referred to as corresponding to raw frame (or picture) image data. For example, raw frame (or picture) image data may undergo processing to generate luma and chroma samples. In some embodiments, the set of luma samples in a macro-block is of one particular arrangement (e.g., 16×16), and set of the chroma samples is of a different particular arrangement (e.g., 8×8). In accordance with the embodiment depicted herein, a video encoder processes such samples on a block by block basis.

The input video signal then undergoes mode selection by which the input video signal selectively undergoes intra and/or inter-prediction processing. Generally speaking, the input video signal undergoes compression along a compression pathway. When operating with no feedback (e.g., in accordance with neither inter-prediction nor intra-prediction), the input video signal is provided via the compression pathway to undergo transform operations (e.g., in accordance with discrete cosine transform (DCT)). Of course, other transforms may be employed in alternative embodiments. In this mode of operation, the input video signal itself is that which is compressed. The compression pathway may take advantage of the lack of high frequency sensitivity of human eyes in performing the compression.

However, feedback may be employed along the compression pathway by selectively using inter- or intra-prediction video encoding. In accordance with a feedback or predictive mode of operation, the compression pathway operates on a (relatively low energy) residual (e.g., a difference) resulting from subtraction of a predicted value of a current macro-block from the current macro-block. Depending upon which form of prediction is employed in a given instance, a residual or difference between a current macro-block and a predicted value of that macro-block based on at least a portion of that same frame (or picture) or on at least a portion of at least one other frame (or picture) is generated.

The resulting modified video signal then undergoes transform operations along the compression pathway. In one embodiment, a discrete cosine transform (DCT) operates on a set of video samples (e.g., luma, chroma, residual, etc.) to compute respective coefficient values for each of a predetermined number of basis patterns. For example, one embodiment includes 64 basis functions (e.g., such as for an 8×8 sample). Generally speaking, different embodiments may employ different numbers of basis functions (e.g., different transforms). Any combination of those respective basis functions, including appropriate and selective weighting thereof, may be used to represent a given set of video samples. Additional details related to various ways of performing transform operations are described in the technical literature associated with video encoding including those standards/draft standards that have been incorporated by reference as indicated above. The output from the transform processing includes such respective coefficient values. This output is provided to a quantizer.

Generally, most image blocks will typically yield coefficients (e.g., DCT coefficients in an embodiment operating in accordance with discrete cosine transform (DCT)) such that the most relevant DCT coefficients are of lower frequencies. Because of this and of the human eyes' relatively poor sensitivity to high frequency visual effects, a quantizer may be operable to convert most of the less relevant coefficients to a value of zero. That is to say, those coefficients whose relative contribution is below some predetermined value (e.g., some threshold) may be eliminated in accordance with the quantization process. A quantizer may also be operable to convert the significant coefficients into values that can be coded more efficiently than those that result from the transform process. For example, the quantization process may operate by dividing each respective coefficient by an integer value and discarding any remainder. Such a process, when operating on typical coding units or macro-blocks, typically yields a relatively low number of non-zero coefficients which are then delivered to an entropy encoder for lossless encoding and for use in accordance with a feedback path which may select intra-prediction and/or inter-prediction processing in accordance with video encoding.

An entropy encoder operates in accordance with a lossless compression encoding process. In comparison, the quantization operations are generally lossy. The entropy encoding process operates on the coefficients provided from the quantization process. Those coefficients may represent various characteristics (e.g., luma, chroma, residual, etc.). Various types of encoding may be employed by an entropy encoder. For example, context-adaptive binary arithmetic coding (CABAC) and/or context-adaptive variable-length coding (CAVLC) may be performed by the entropy encoder. For example, in accordance with at least one part of an entropy coding scheme, the data is converted to a (run, level) pairing (e.g., data 14, 3, 0, 4, 0, 0, −3 would be converted to the respective (run, level) pairs of (0, 14), (0, 3), (1, 4), (2,−3)). In advance, a table may be prepared that assigns variable length codes for value pairs, such that relatively shorter length codes are assigned to relatively common value pairs, and relatively longer length codes are assigned for relatively less common value pairs.

As the reader will understand, the operations of inverse quantization and inverse transform correspond to those of quantization and transform, respectively. For example, in an embodiment in which a DCT is employed within the transform operations, then an inverse DCT (IDCT) is that employed within the inverse transform operations.

An adaptive loop filter (ALF) is implemented to process the output from the inverse transform block. Such an adaptive loop filter (ALF) is applied to the decoded picture before it is stored in a picture buffer (sometimes referred to as a DPB, digital picture buffer). The adaptive loop filter (ALF) is implemented to reduce coding noise of the decoded picture, and the filtering thereof may be selectively applied on a slice by slice basis, respectively, for luminance and chrominance whether or not the adaptive loop filter (ALF) is applied either at slice level or at block level. Two-dimensional 2-D finite impulse response (FIR) filtering may be used in application of the adaptive loop filter (ALF). The coefficients of the filters may be designed slice by slice at the encoder, and such information is then signaled to the decoder (e.g., signaled from a transmitter communication device including a video encoder

[alternatively referred to as encoder] to a receiver communication device including a video decoder [alternatively referred to as decoder]).

One embodiment operates by generating the coefficients in accordance with Wiener filtering design. In addition, it may be applied on a block by block based at the encoder whether the filtering is performed and such a decision is then signaled to the decoder (e.g., signaled from a transmitter communication device including a video encoder [alternatively referred to as encoder] to a receiver communication device including a video decoder [alternatively referred to as decoder]) based on quadtree structure, where the block size is decided according to the rate-distortion optimization. It is noted that the implementation of using such 2-D filtering may introduce a degree of complexity in accordance with both encoding and decoding. For example, by using 2-D filtering in accordance and implementation of an adaptive loop filter (ALF), there may be some increasing complexity within encoder implemented within the transmitter communication device as well as within a decoder implemented within a receiver communication device.

In certain optional embodiments, the output from the de-blocking filter is provided to one or more other in-loop filters (e.g., implemented in accordance with adaptive loop filter (ALF), sample adaptive offset (SAO) filter, and/or any other filter type) implemented to process the output from the inverse transform block. For example, such an ALF is applied to the decoded picture before it is stored in a picture buffer (again, sometimes alternatively referred to as a DPB, digital picture buffer). Such an ALF is implemented to reduce coding noise of the decoded picture, and the filtering thereof may be selectively applied on a slice by slice basis, respectively, for luminance and chrominance whether or not such an ALF is applied either at slice level or at block level. Two-dimensional 2-D finite impulse response (FIR) filtering may be used in application of such an ALF. The coefficients of the filters may be designed slice by slice at the encoder, and such information is then signaled to the decoder (e.g., signaled from a transmitter communication device including a video encoder [alternatively referred to as encoder] to a receiver communication device including a video decoder [alternatively referred to as decoder]).

One embodiment is operative to generate the coefficients in accordance with Wiener filtering design. In addition, it may be applied on a block by block based at the encoder whether the filtering is performed and such a decision is then signaled to the decoder (e.g., signaled from a transmitter communication device including a video encoder [alternatively referred to as encoder] to a receiver communication device including a video decoder [alternatively referred to as decoder]) based on quadtree structure, where the block size is decided according to the rate-distortion optimization. It is noted that the implementation of using such 2-D filtering may introduce a degree of complexity in accordance with both encoding and decoding. For example, by using 2-D filtering in accordance and implementation of an ALF, there may be some increasing complexity within encoder implemented within the transmitter communication device as well as within a decoder implemented within a receiver communication device.

As mentioned with respect to other embodiments, the use of an ALF can provide any of a number of improvements in accordance with such video processing, including an improvement on the objective quality measure by the peak to signal noise ratio (PSNR) that comes from performing random quantization noise removal. In addition, the subjective quality of a subsequently encoded video signal may be achieved from illumination compensation, which may be introduced in accordance with performing offset processing and scaling processing (e.g., in accordance with applying a gain) in accordance with ALF processing.

With respect to one type of an in-loop filter, the use of an adaptive loop filter (ALF) can provide any of a number of improvements in accordance with such video processing, including an improvement on the objective quality measure by the peak to signal noise ratio (PSNR) that comes from performing random quantization noise removal. In addition, the subjective quality of a subsequently encoded video signal may be achieved from illumination compensation, which may be introduced in accordance with performing offset processing and scaling processing (e.g., in accordance with applying a gain) in accordance with adaptive loop filter (ALF) processing.

Receiving the signal output from the ALF is a picture buffer, alternatively referred to as a digital picture buffer or a DPB; the picture buffer is operative to store the current frame (or picture) and/or one or more other frames (or pictures) such as may be used in accordance with intra-prediction and/or inter-prediction operations as may be performed in accordance with video encoding. It is noted that in accordance with intra-prediction, a relatively small amount of storage may be sufficient, in that, it may not be necessary to store the current frame (or picture) or any other frame (or picture) within the frame (or picture) sequence. Such stored information may be employed for performing motion compensation and/or motion estimation in the case of performing inter-prediction in accordance with video encoding.

In one possible embodiment, for motion estimation, a respective set of luma samples (e.g., 16×16) from a current frame (or picture) are compared to respective buffered counterparts in other frames (or pictures) within the frame (or picture) sequence (e.g., in accordance with inter-prediction). In one possible implementation, a closest matching area is located (e.g., prediction reference) and a vector offset (e.g., motion vector) is produced. In a single frame (or picture), a number of motion vectors may be found and not all will necessarily point in the same direction. One or more operations as performed in accordance with motion estimation are operative to generate one or more motion vectors.

Motion compensation is operative to employ one or more motion vectors as may be generated in accordance with motion estimation. A prediction reference set of samples is identified and delivered for subtraction from the original input video signal in an effort hopefully to yield a relatively (e.g., ideally, much) lower energy residual. If such operations do not result in a yielded lower energy residual, motion compensation need not necessarily be performed and the transform operations may merely operate on the original input video signal instead of on a residual (e.g., in accordance with an operational mode in which the input video signal is provided straight through to the transform operation, such that neither intra-prediction nor inter-prediction are performed), or intra-prediction may be utilized and transform operations performed on the residual resulting from intra-prediction. Also, if the motion estimation and/or motion compensation operations are successful, the motion vector may also be sent to the entropy encoder along with the corresponding residual's coefficients for use in undergoing lossless entropy encoding.

The output from the overall video encoding operation is an output bit stream. It is noted that such an output bit stream may of course undergo certain processing in accordance with generating a continuous time signal which may be transmitted via a communication channel. For example, certain embodiments operate within wireless communication systems. In such an instance, an output bitstream may undergo appropriate digital to analog conversion, frequency conversion, scaling, filtering, modulation, symbol mapping, and/or any other operations within a wireless communication device that operate to generate a continuous time signal capable of being transmitted via a communication channel, etc.

Referring to embodiment 600 of FIG. 6, with respect to this diagram depicting an alternative embodiment of a video encoder, such a video encoder carries out prediction, transform, and encoding processes to produce a compressed output bit stream. Such a video encoder may operate in accordance with and be compliant with one or more video encoding protocols, standards, and/or recommended practices such as ISO/IEC 14496-10—MPEG-4 Part 10, AVC (Advanced Video Coding), alternatively referred to as H.264/MPEG-4 Part 10 or AVC (Advanced Video Coding), ITU H.264/MPEG4-AVC.

It is noted that a corresponding video decoder, such as located within a device at another end of a communication channel, is operative to perform the complementary processes of decoding, inverse transform, and reconstruction to produce a respective decoded video sequence that is (ideally) representative of the input video signal.

As may be seen with respect to this diagram, alternative arrangements and architectures may be employed for effectuating video encoding. Generally speaking, an encoder processes an input video signal (e.g., typically composed in units of coding units or macro-blocks, often times being square in shape and including N×N pixels therein). The video encoding determines a prediction of the current macro-block based on previously coded data. That previously coded data may come from the current frame (or picture) itself (e.g., such as in accordance with intra-prediction) or from one or more other frames (or pictures) that have already been coded (e.g., such as in accordance with inter-prediction). The video encoder subtracts the prediction of the current macro-block to form a residual.

Generally speaking, intra-prediction is operative to employ block sizes of one or more particular sizes (e.g., 16×16, 8×8, or 4×4) to predict a current macro-block from surrounding, previously coded pixels within the same frame (or picture). Generally speaking, inter-prediction is operative to employ a range of block sizes (e.g., 16×16 down to 4×4) to predict pixels in the current frame (or picture) from regions that are selected from within one or more previously coded frames (or pictures).

With respect to the transform and quantization operations, a block of residual samples may undergo transformation using a particular transform (e.g., 4×4 or 8×8). One possible embodiment of such a transform operates in accordance with discrete cosine transform (DCT). The transform operation outputs a group of coefficients such that each respective coefficient corresponds to a respective weighting value of one or more basis functions associated with a transform. After undergoing transformation, a block of transform coefficients is quantized (e.g., each respective coefficient may be divided by an integer value and any associated remainder may be discarded, or they may be multiplied by an integer value). The quantization process is generally inherently lossy, and it can reduce the precision of the transform coefficients according to a quantization parameter (QP). Typically, many of the coefficients associated with a given macro-block are zero, and only some nonzero coefficients remain. Generally, a relatively high QP setting is operative to result in a greater proportion of zero-valued coefficients and smaller magnitudes of non-zero coefficients, resulting in relatively high compression (e.g., relatively lower coded bit rate) at the expense of relatively poorly decoded image quality; a relatively low QP setting is operative to allow more nonzero coefficients to remain after quantization and larger magnitudes of non-zero coefficients, resulting in relatively lower compression (e.g., relatively higher coded bit rate) with relatively better decoded image quality.

The video encoding process produces a number of values that are encoded to form the compressed bit stream. Examples of such values include the quantized transform coefficients, information to be employed by a decoder to re-create the appropriate prediction, information regarding the structure of the compressed data and compression tools employed during encoding, information regarding a complete video sequence, etc. Such values and/or parameters (e.g., syntax elements) may undergo encoding within an entropy encoder operating in accordance with CABAC, CAVLC, or some other entropy coding scheme, to produce an output bit stream that may be stored, transmitted (e.g., after undergoing appropriate processing to generate a continuous time signal that comports with a communication channel), etc.

In an embodiment operating using a feedback path, the output of the transform and quantization undergoes inverse quantization and inverse transform. One or both of intra-prediction and inter-prediction may be performed in accordance with video encoding. Also, motion compensation and/or motion estimation may be performed in accordance with such video encoding.

The signal path output from the inverse quantization and inverse transform (e.g., IDCT) block, which is provided to the intra-prediction block, is also provided to a de-blocking filter. The output from the de-blocking filter is provided to one or more other in-loop filters (e.g., implemented in accordance with adaptive loop filter (ALF), sample adaptive offset (SAO) filter, and/or any other filter type) implemented to process the output from the inverse transform block. For example, in one possible embodiment, an ALF is applied to the decoded picture before it is stored in a picture buffer (again, sometimes alternatively referred to as a DPB, digital picture buffer).

The ALF is implemented to reduce coding noise of the decoded picture, and the filtering thereof may be selectively applied on a slice by slice basis, respectively, for luminance and chrominance whether or not the ALF is applied either at slice level or at block level. Two-dimensional 2-D finite impulse response (FIR) filtering may be used in application of the ALF. The coefficients of the filters may be designed slice by slice at the encoder, and such information is then signaled to the decoder (e.g., signaled from a transmitter communication device including a video encoder [alternatively referred to as encoder] to a receiver communication device including a video decoder [alternatively referred to as decoder]).

One embodiment generated the coefficients in accordance with Wiener filtering design. In addition, it may be applied on a block by block based at the encoder whether the filtering is performed and such a decision is then signaled to the decoder (e.g., signaled from a transmitter communication device including a video encoder [alternatively referred to as encoder] to a receiver communication device including a video decoder [alternatively referred to as decoder]) based on quadtree structure, where the block size is decided according to the rate-distortion optimization. It is noted that the implementation of using such 2-D filtering may introduce a degree of complexity in accordance with both encoding and decoding. For example, by using 2-D filtering in accordance and implementation of an ALF, there may be some increasing complexity within encoder implemented within the transmitter communication device as well as within a decoder implemented within a receiver communication device.

As mentioned with respect to other embodiments, the use of an ALF can provide any of a number of improvements in accordance with such video processing, including an improvement on the objective quality measure by the peak to signal noise ratio (PSNR) that comes from performing random quantization noise removal. In addition, the subjective quality of a subsequently encoded video signal may be achieved from illumination compensation, which may be introduced in accordance with performing offset processing and scaling processing (e.g., in accordance with applying a gain) in accordance with ALF processing.

With respect to any video encoder architecture implemented to generate an output bitstream, it is noted that such architectures may be implemented within any of a variety of communication devices. The output bitstream may undergo additional processing including error correction code (ECC), forward error correction (FEC), etc. thereby generating a modified output bitstream having additional redundancy deal therein. Also, as may be understood with respect to such a digital signal, it may undergo any appropriate processing in accordance with generating a continuous time signal suitable for or appropriate for transmission via a communication channel That is to say, such a video encoder architecture may be of limited within a communication device operative to perform transmission of one or more signals via one or more communication channels. Additional processing may be made on an output bitstream generated by such a video encoder architecture thereby generating a continuous time signal that may be launched into a communication channel.

Figure 7:
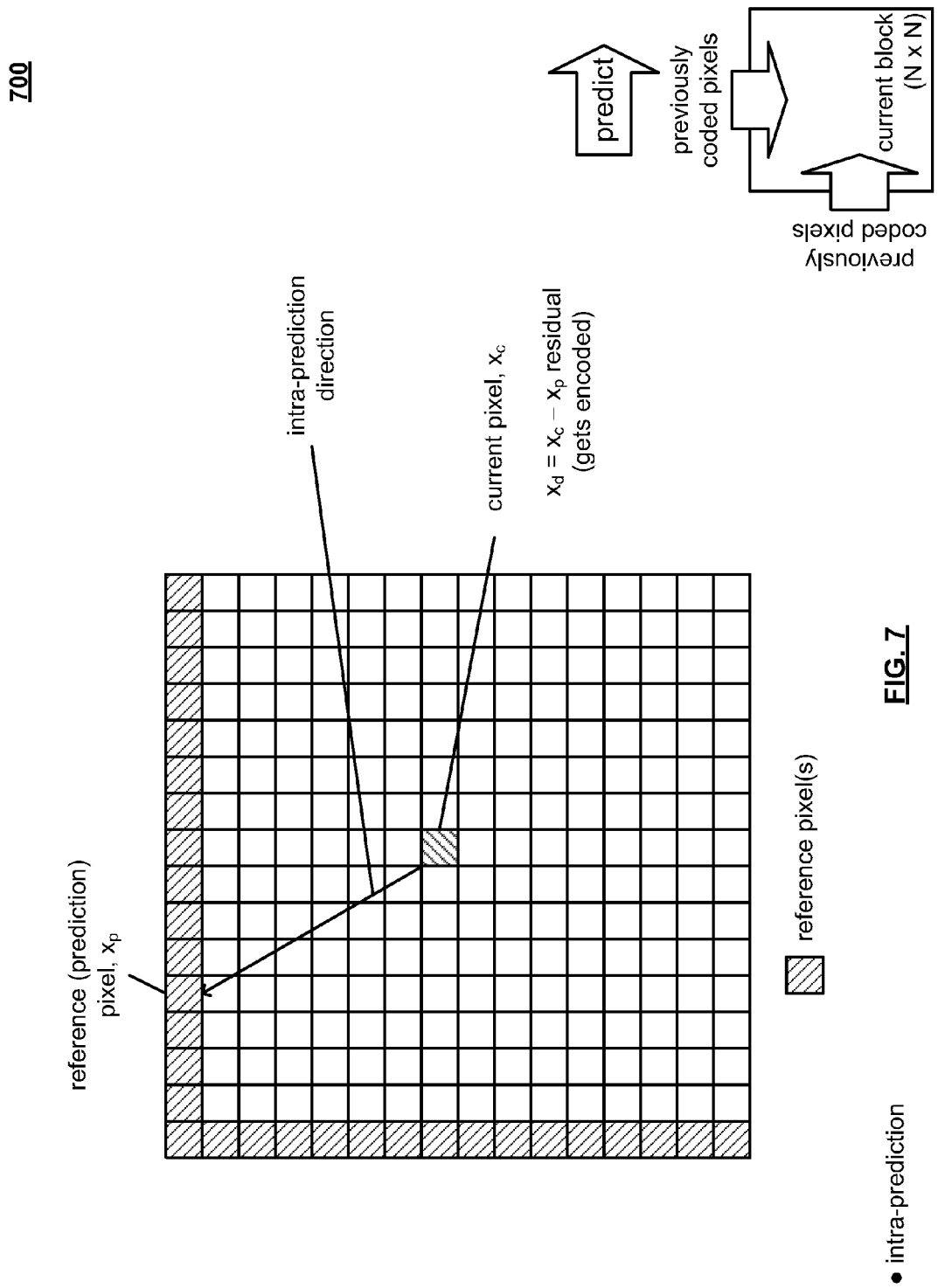
FIG. 7 is a diagram illustrating an embodiment of intra-prediction processing.

FIG. 7 is a diagram illustrating an embodiment 700 of intra-prediction processing. As can be seen with respect to this diagram, a current block of video data (e.g., often times being square in shape and including generally N×N pixels) undergoes processing to estimate the respective pixels therein. Previously coded pixels located above and to the left of the current block are employed in accordance with such intra-prediction. From certain perspectives, an intra-prediction direction may be viewed as corresponding to a vector extending from a current pixel to a reference pixel located above or to the left of the current pixel. Details of intra-prediction as applied to coding in accordance with H.264/AVC are specified within the corresponding standard (e.g., International Telecommunication Union, ITU-T, TELE-COMMUNICATION STANDARDIZATION SECTOR OF ITU, H.264 (March 2010), SERIES H: AUDIOVISUAL AND MULTIMEDIA SYSTEMS, Infrastructure of audiovisual services—Coding of moving video, Advanced video coding for generic audiovisual services, Recommendation ITU-T H.264, also alternatively referred to as International Telecomm ISO/IEC 14496-10—MPEG-4 Part 10, AVC (Advanced Video Coding), H.264/MPEG-4 Part 10 or AVC (Advanced Video Coding), ITU H.264/MPEG4-AVC, or equivalent) that is incorporated by reference above.

The residual, which is the difference between the current pixel and the reference or prediction pixel, is that which gets encoded. As can be seen with respect to this diagram, intra-prediction operates using pixels within a common frame (or picture). It is of course noted that a given pixel may have different respective components associated therewith, and there may be different respective sets of samples for each respective component.

Figure 8:
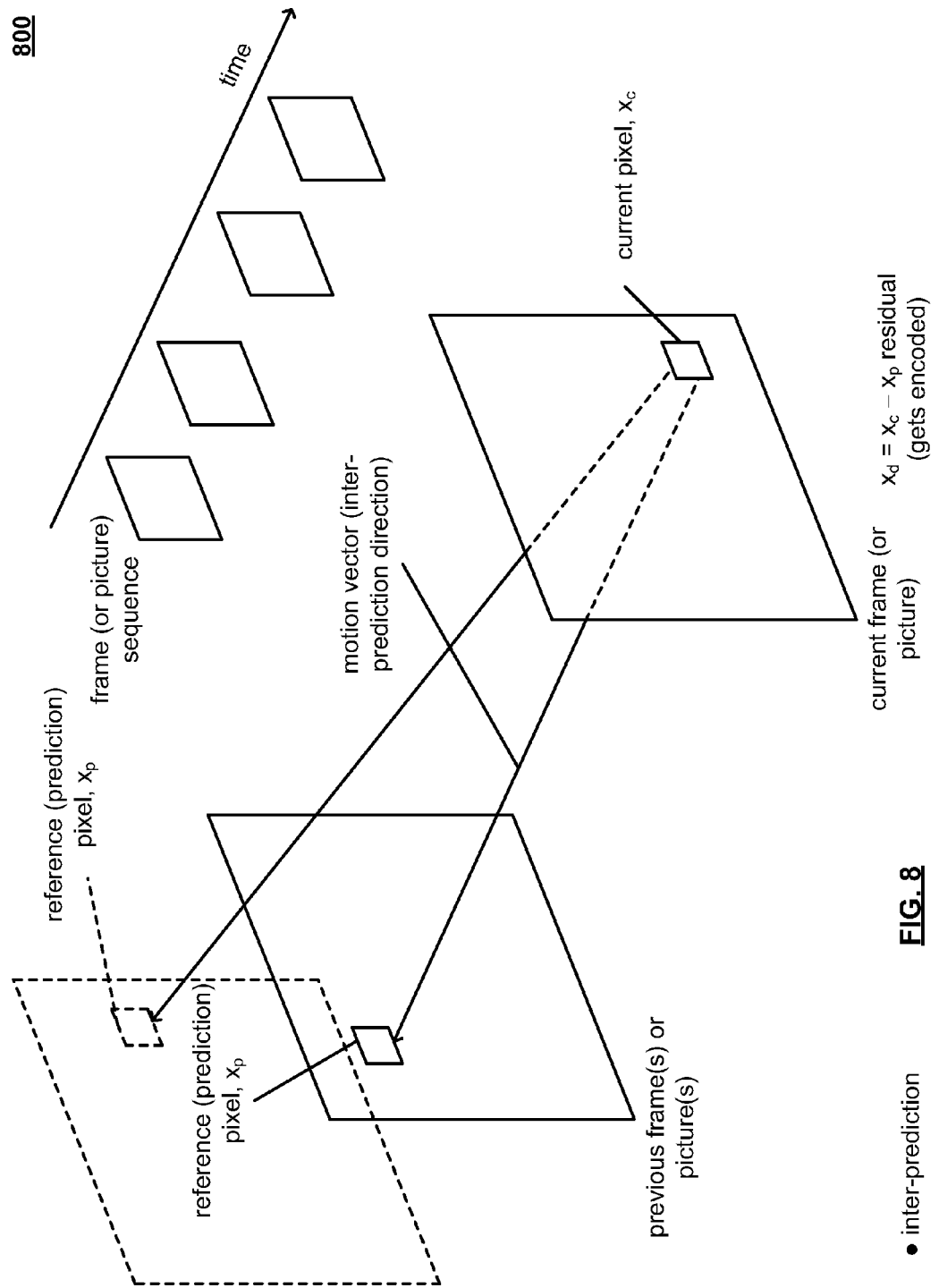
FIG. 8 is a diagram illustrating an embodiment of inter-prediction processing.

FIG. 8 is a diagram illustrating an embodiment 800 of inter-prediction processing. In contradistinction to intra-prediction, inter-prediction is operative to identify a motion vector (e.g., an inter-prediction direction) based on a current set of pixels within a current frame (or picture) and one or more sets of reference or prediction pixels located within one or more other frames (or pictures) within a frame (or picture) sequence. As can be seen, the motion vector extends from the current frame (or picture) to another frame (or picture) within the frame (or picture) sequence. Inter-prediction may utilize sub-pixel interpolation, such that a prediction pixel value corresponds to a function of a plurality of pixels in a reference frame or picture.

A residual may be calculated in accordance with inter-prediction processing, though such a residual is different from the residual calculated in accordance with intra-prediction processing. In accordance with inter-prediction processing, the residual at each pixel again corresponds to the difference between a current pixel and a predicted pixel value. However, in accordance with inter-prediction processing, the current pixel and the reference or prediction pixel are not located within the same frame (or picture). While this diagram shows inter-prediction as being employed with respect to one or more previous frames or pictures, it is also noted that alternative embodiments may operate using references corresponding to frames before and/or after a current frame. For example, in accordance with appropriate buffering and/or memory management, a number of frames may be stored. When operating on a given frame, references may be generated from other frames that precede and/or follow that given frame.

Coupled with the CU, a basic unit may be employed for the prediction partition mode, namely, the prediction unit, or PU. It is also noted that the PU is defined only for the last depth CU, and its respective size is limited to that of the CU.

Figure 9:
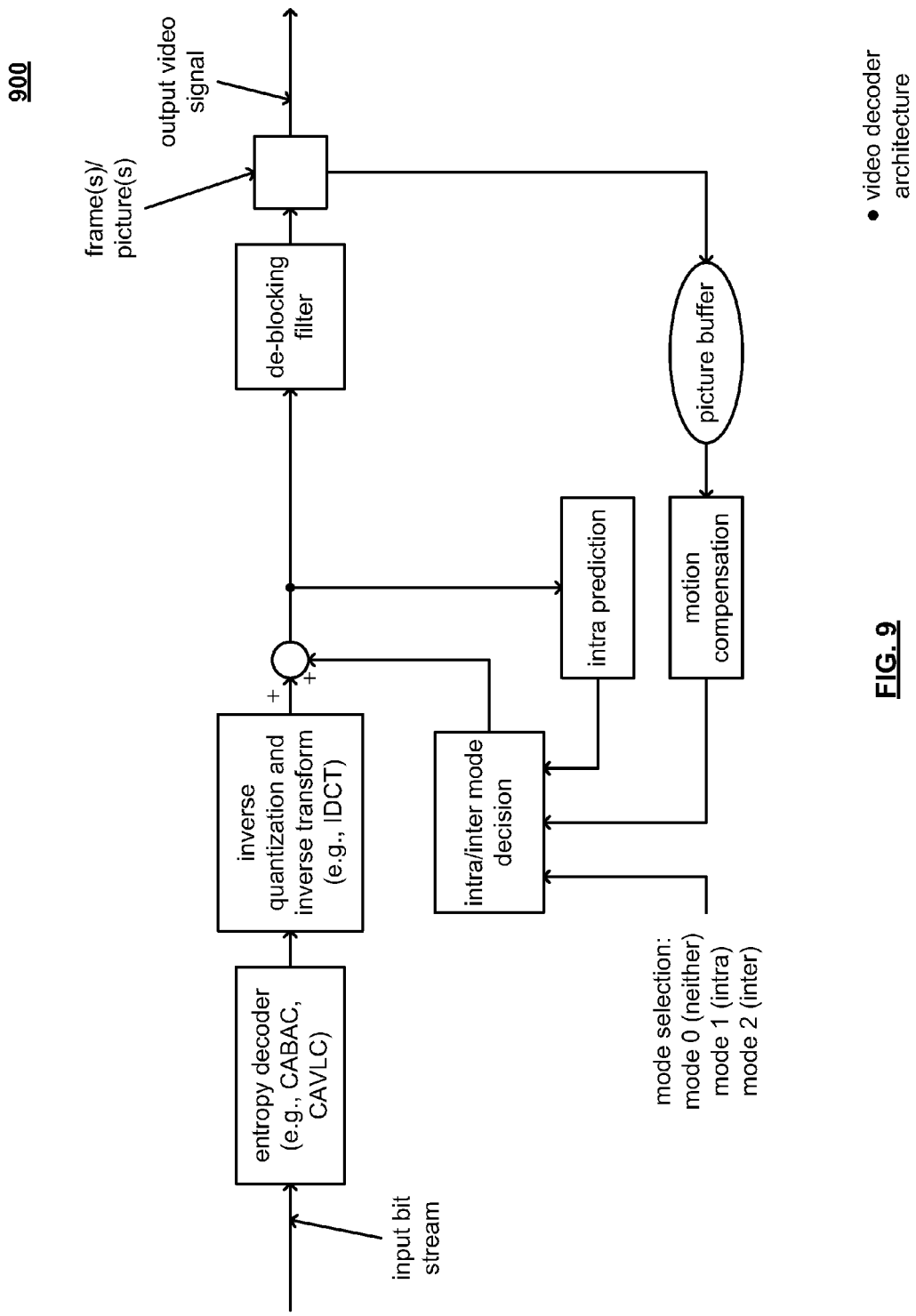
FIG. 9 and FIG. 10 are diagrams illustrating various embodiments of video decoding architectures.
Figure 10:
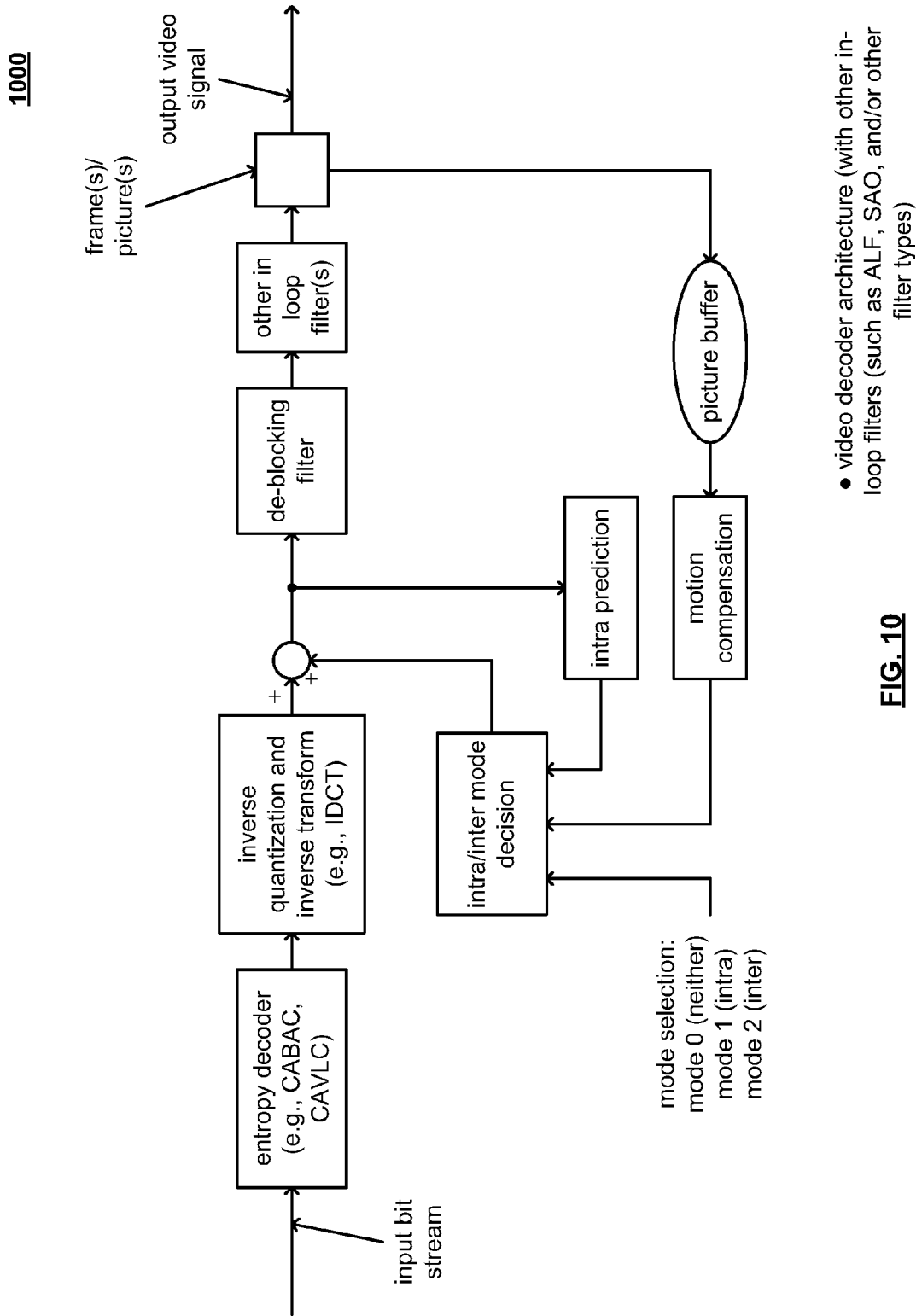

FIG. 9 and FIG. 10 are diagrams illustrating various embodiments 900 and 1000, respectively, of video decoding architectures.

Generally speaking, such video decoding architectures operate on an input bitstream. It is of course noted that such an input bitstream may be generated from a signal that is received by a communication device from a communication channel. Various operations may be performed on a continuous time signal received from the communication channel, including digital sampling, demodulation, scaling, filtering, etc. such as may be appropriate in accordance with generating the input bitstream. Moreover, certain embodiments, in which one or more types of error correction code (ECC), forward error correction (FEC), etc. may be implemented, may perform appropriate decoding in accordance with such ECC, FEC, etc. thereby generating the input bitstream. That is to say, in certain embodiments in which additional redundancy may have been made in accordance with generating a corresponding output bitstream (e.g., such as may be launched from a transmitter communication device or from the transmitter portion of a transceiver communication device), appropriate processing may be performed in accordance with generating the input bitstream. Overall, such a video decoding architectures and lamented to process the input bitstream thereby generating an output video signal corresponding to the original input video signal, as closely as possible and perfectly in an ideal case, for use in being output to one or more video display capable devices.

Referring to the embodiment 900 of FIG. 9, generally speaking, a decoder such as an entropy decoder (e.g., which may be implemented in accordance with CABAC, CAVLC, etc.) processes the input bitstream in accordance with performing the complementary process of encoding as performed within a video encoder architecture. The input bitstream may be viewed as being, as closely as possible and perfectly in an ideal case, the compressed output bitstream generated by a video encoder architecture. Of course, in a real-life application, it is possible that some errors may have been incurred in a signal transmitted via one or more communication links. The entropy decoder processes the input bitstream and extracts the appropriate coefficients, such as the DCT coefficients (e.g., such as representing chroma, luma, etc. information) and provides such coefficients to an inverse quantization and inverse transform block. In the event that a DCT transform is employed, the inverse quantization and inverse transform block may be implemented to perform an inverse DCT (IDCT) operation. Subsequently, A/D blocking filter is implemented to generate the respective frames and/or pictures corresponding to an output video signal. These frames and/or pictures may be provided into a picture buffer, or a digital picture buffer (DPB) for use in performing other operations including motion compensation. Generally speaking, such motion compensation operations may be viewed as corresponding to inter-prediction associated with video encoding. Also, intra-prediction may also be performed on the signal output from the inverse quantization and inverse transform block. Analogously as with respect to video encoding, such a video decoder architecture may be implemented to perform mode selection between performing it neither intra-prediction nor inter-prediction, inter-prediction, or intra-prediction in accordance with decoding an input bitstream thereby generating an output video signal.

Referring to the embodiment 1000 of FIG. 10, in certain optional embodiments, one or more in-loop filters (e.g., implemented in accordance with adaptive loop filter (ALF), sample adaptive offset (SAO) filter, and/or any other filter type) such as may be implemented in accordance with video encoding as employed to generate an output bitstream, a corresponding one or more in-loop filters may be implemented within a video decoder architecture. In one embodiment, an appropriate implementation of one or more such in-loop filters is after the de-blocking filter.

Figure 11:
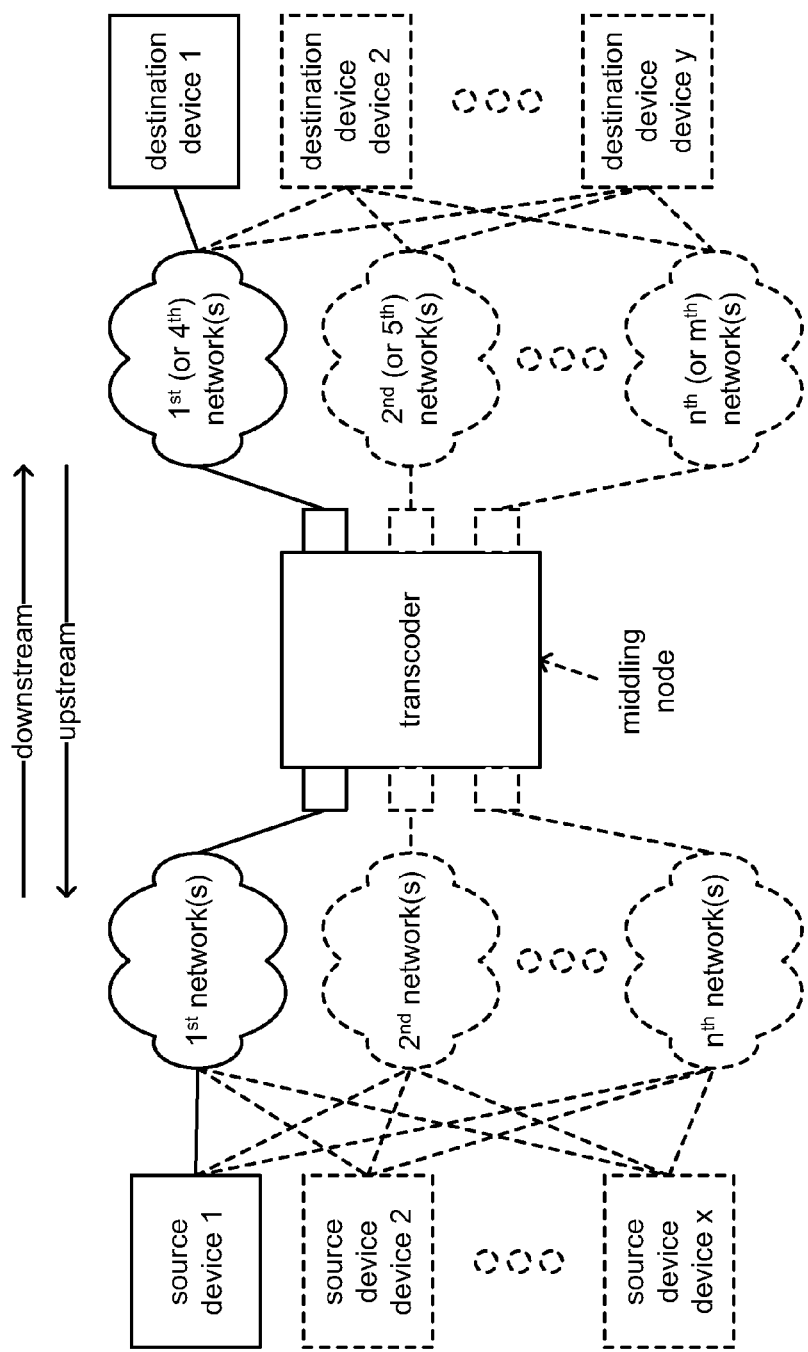
FIG. 11 illustrates an embodiment of a transcoder implemented within a communication system.

FIG. 11 illustrates an embodiment 1100 of a transcoder implemented within a communication system. As may be seen with respect to this diagram, a transcoder may be implemented within a communication system composed of one or more networks, one or more source devices, and/or one or more destination devices. Generally speaking, such a transcoder may be viewed as being a middling device interveningly implemented between at least one source device and at least one destination device as connected and/or coupled via one or more communication links, networks, etc. In certain situations, such a transcoder may be implemented to include multiple inputs and/or multiple outputs for receiving and/or transmitting different respective signals from and/or to one or more other devices.

Operation of any one or more modules, circuitries, processes, steps, etc. within the transcoder may be adaptively made based upon consideration associated with local operational parameters and/or remote operational parameters. Examples of local operational parameters may be viewed as corresponding to provisioned and/or currently available hardware, processing resources, memory, etc. Examples of remote operational parameters may be viewed as corresponding to characteristics associated with respective streaming media flows, including delivery flows and/or source flows, corresponding to signaling which is received from and/or transmitted to one or more other devices, including source devices and or destination devices. For example, characteristics associated with any media flow may be related to any one or more of latency, delay, noise, distortion, crosstalk, attenuation, signal to noise ratio (SNR), capacity, bandwidth, frequency spectrum, bit rate, symbol rate associated with the at least one streaming media source flow, and/or any other characteristic, etc. Considering another example, characteristics associated with any media flow may be related more particularly to a given device from which or through which such a media flow may pass including any one or more of user usage information, processing history, queuing, an energy constraint, a display size, a display resolution, a display history associated with the device, and/or any other characteristic, etc. Moreover, various signaling may be provided between respective devices in addition to signaling of media flows. That is to say, various feedback or control signals may be provided between respective devices within such a communication system.

In at least one embodiment, such a transcoder is implemented for selectively transcoding at least one streaming media source flow thereby generating at least one transcoded streaming media delivery flow based upon one or more characteristics associated with the at least one streaming media source flow and/or the at least one transcoder that streaming media delivery flow (e.g., actual and/or estimated one or more characteristics). That is to say, consideration may be performed by considering characteristics associated with flows with respect to an upstream perspective, a downstream perspective, and/or both an upstream and downstream perspective. Based upon these characteristics, including historical information related thereto, current information related thereto, and/or predicted future information related thereto, adaptation of the respective transcoding as performed within the transcoder may be made. Again, consideration may also be made with respect to global operating conditions and/or the current status of operations being performed within the transcoder itself. That is to say, consideration with respect to local operating conditions (e.g., available processing resources, available memory, source flow(s) being received, delivery flow(s) being transmitted, etc.) may also be used to effectuate adaptation of respective transcoding as performed within the transcoder.

In certain embodiments, adaptation is performed by selecting one particular video coding protocol or standard from among a number of available video coding protocols or standards. If desired, such adaptation may be with respect to selecting one particular profile of a given video coding protocol or standard from among a number of available profiles corresponding to one or more video coding protocols or standards. Alternatively, such adaptation may be made with respect to modifying one or more operational parameters associated with a video coding protocol or standard, a profile thereof, or a subset of operational parameters associated with the video coding protocol or standard.

In other embodiments, adaptation is performed by selecting different respective manners by which video coding may be performed. That is to say, certain video coding, particularly operative in accordance with entropy coding, maybe context adaptive, non-context adaptive, operative in accordance with syntax, or operative in accordance with no syntax. Adaptive selection between such operational modes, specifically between context adaptive and non-context adaptive, and with or without syntax, may be made based upon such considerations as described herein.

Generally speaking, a real time transcoding environment may be implemented wherein scalable video coding (SVC) operates both upstream and downstream of the transcoder and wherein the transcoder acts to coordinate upstream SVC with downstream SVC. Such coordination involves both internal sharing real time awareness of activities wholly within each of the transcoding decoder and transcoding encoder. This awareness extends to external knowledge gleaned by the transcoding encoder and decoder when evaluating their respective communication PHY/channel performance. Further, such awareness exchange extends to actual feedback received from a downstream media presentation device' decoder and PHY, as well as an upstream media source encoder and PHY. To fully carry out SVC plus overall flow management, control signaling via industry or proprietary standard channels flow between all three nodes.

Figure 12:
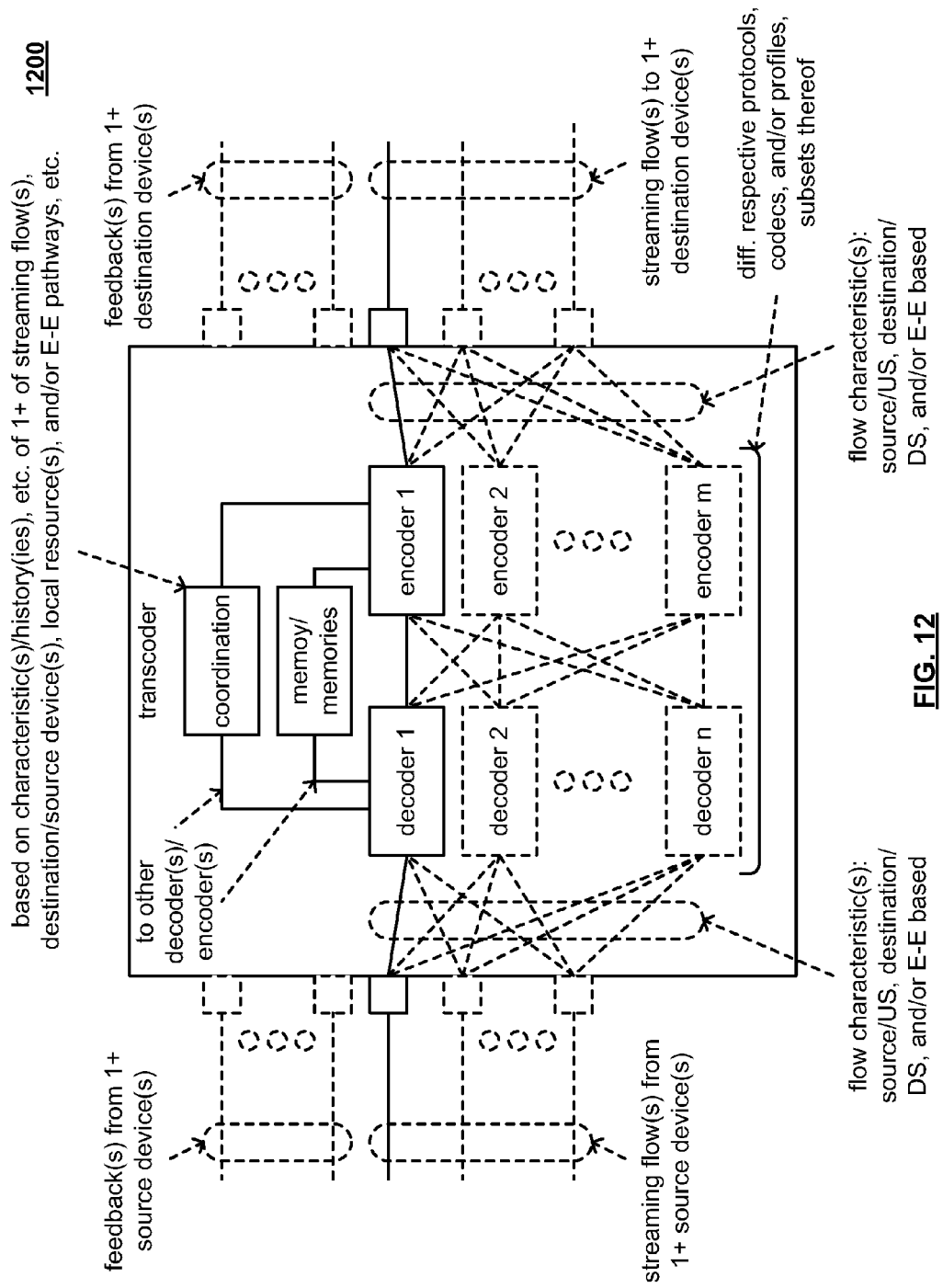
FIG. 12 illustrates an alternative embodiment of a transcoder implemented within a communication system.

FIG. 12 illustrates an alternative embodiment 1200 of a transcoder implemented within a communication system. As can be seen with respect to this diagram, one or more respective decoders and one or more respective and coders may be provisioned each having access to one or more memories and each operating in accordance with coordination based upon any of the various considerations and/or characteristics described herein. For example, characteristics associated with respective streaming flows from one or more source devices, to one or more destination devices, the respective end-to-end pathways between any given source device and any given destination device, feedback and/or control signaling from those source devices/destination devices, local operating considerations, histories, etc. may be used to effectuate adaptive operation of decoding processing and/or encoding processing in accordance with transcoding.

Figure 13:
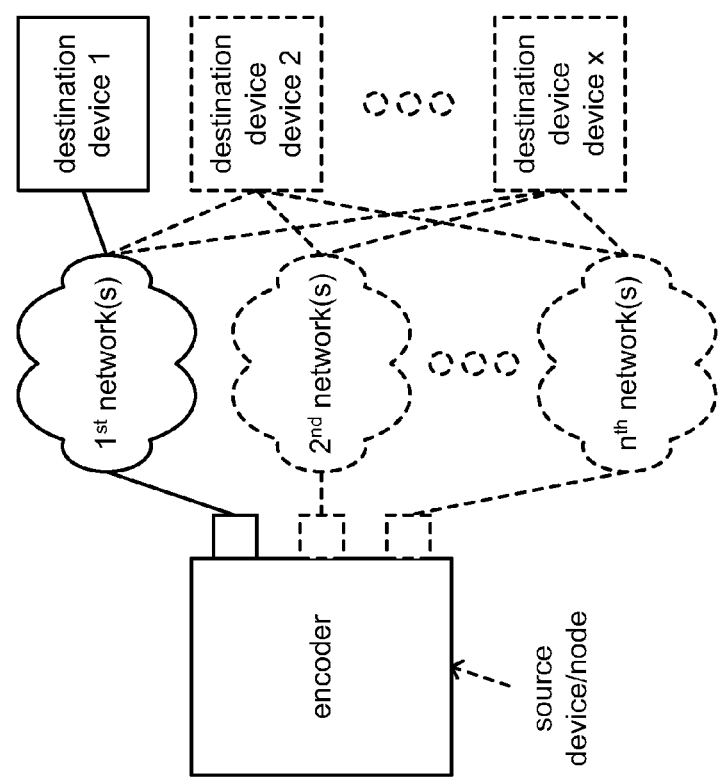
FIG. 13 illustrates an embodiment of an encoder implemented within a communication system.

FIG. 13 illustrates an embodiment 1300 of an encoder implemented within a communication system. As may be seen with respect to this diagram, and encoder may be implemented to generate one or more signals that may be delivered via one or more delivery flows to one or more destination devices via one or more communication networks, links, etc.

As may be analogously understood with respect to the context of transcoding, the corresponding encoding operations performed therein may be applied to a device that does not necessarily performed decoding of received streaming source flows, but is operative to generate streaming delivery flows that may be delivered via one or more delivery flows to one or more destination devices via one or more communication networks, links, etc.

Figure 14:
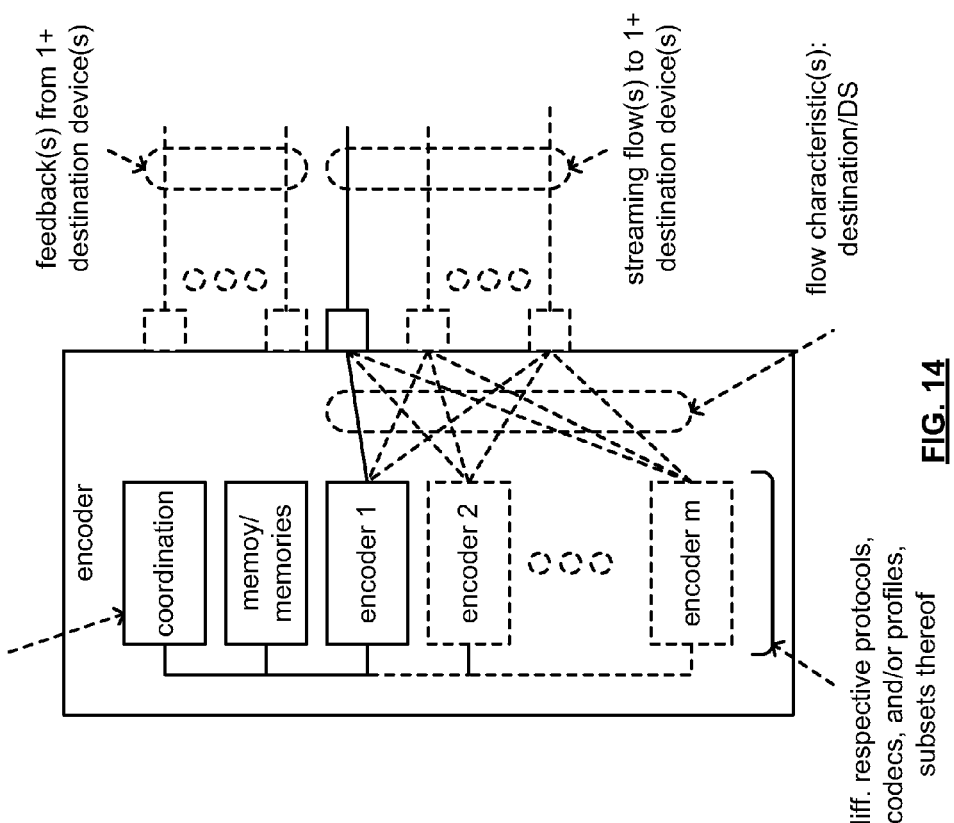
FIG. 14 illustrates an alternative embodiment of an encoder implemented within a communication system.

FIG. 14 illustrates an alternative embodiment 1400 of an encoder implemented within a communication system. As may be seen with respect to this diagram, coordination and adaptation among different respective and coders may be analogously performed within a device implemented for performing encoding as is described elsewhere herein with respect to other diagrams and/or embodiments operative to perform transcoding. That is to say, with respect to an implementation such as depicted within this diagram, adaptation may be effectuated based upon encoding processing and the selection of one encoding over a number of encodings in accordance with any of the characteristics, considerations, whether they be local and/or remote, etc.

Figure 15:
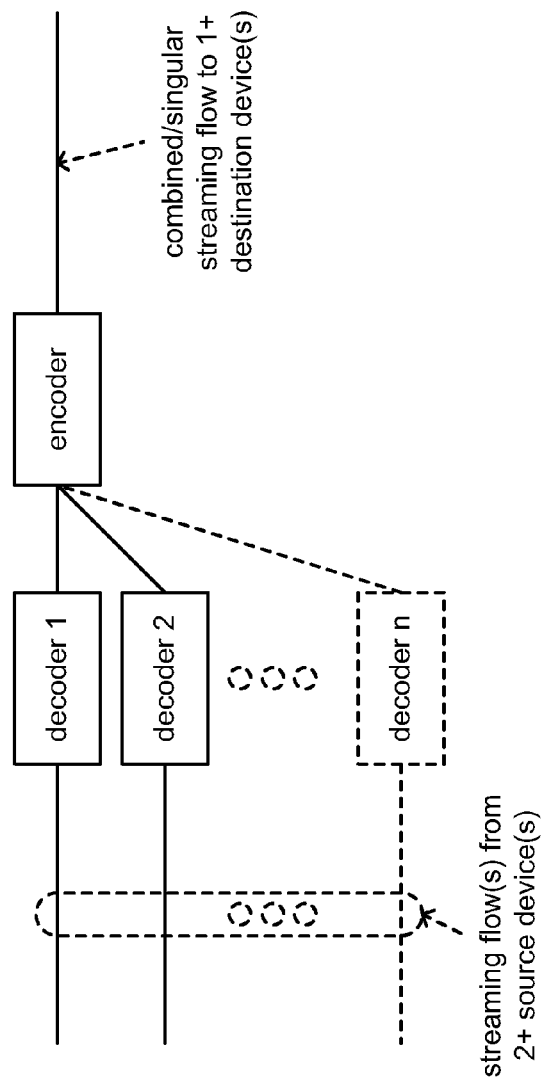
FIG. 15 and FIG. 16 illustrate various embodiments of transcoding.
Figure 16:
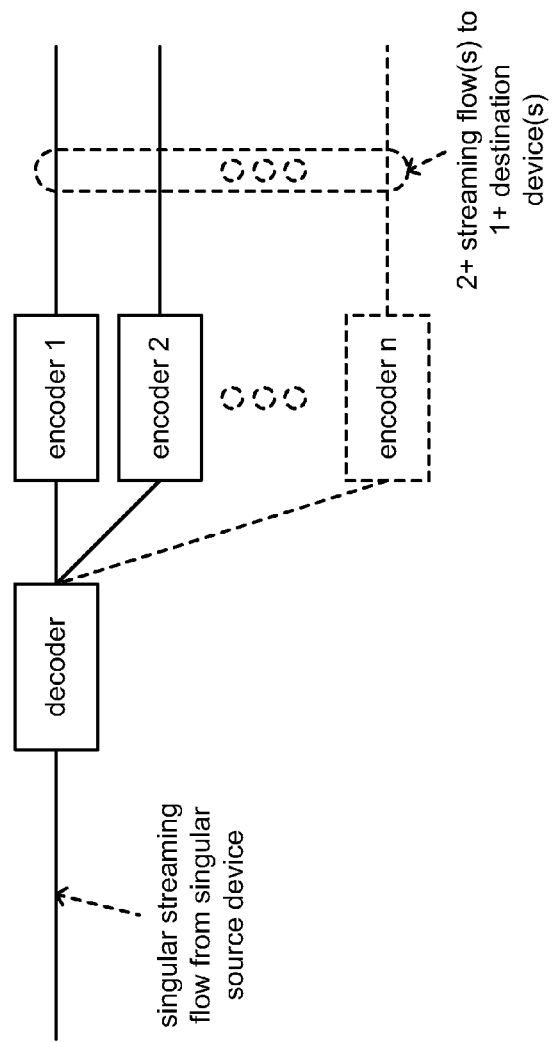

FIG. 15 and FIG. 16 illustrate various embodiments 1500 and 1600, respectively, of transcoding.

Referring to the embodiment 1500 of FIG. 15, this diagram shows two or more streaming source flows being provided from two or more source devices, respectively.

At least two respective decoders are implemented to perform decoding of these streaming source flows simultaneously, in parallel, etc. with respect to each other. The respective decoded outputs generated from those two or more streaming source flows are provided to a singular encoder. The encoder is implemented to generate a combined/singular streaming flow from the two or more respective decoded outputs. This combined/singular streaming flow may be provided to one or more destination devices. As can be seen with respect to this diagram, a combined/singular streaming flow may be generated from more than one streaming source flows from more than one source devices.

Alternatively, there may be some instances in which the two or more streaming source flows may be provided from a singular source device. That is to say, a given video input signal may undergo encoding in accordance with two or more different respective video encoding operational modes thereby generating different respective streaming source flows both commonly generated from the same original input video signal. In some instances, one of the streaming source flows may be provided via a first communication pathway, and another of the streaming source flows may be provided via a second communication pathway. Alternatively, these different respective streaming source flows may be provided via a common communication pathway. There may be instances in which one particular streaming source flow may be more deleteriously affected during transmission than another streaming source flow. That is to say, depending upon the particular manner and coding by which a given streaming source flow has been generated, it may be more susceptible or more resilient to certain deleterious effects (e.g. noise, interference, etc.) during respective transmission via a given communication pathway. In certain embodiments, if sufficient resources are available, it may be desirable not only to generate different respective streaming flows that are provided via different respective communication pathways.

Referring to the embodiment 1600 of FIG. 16, this diagram shows a single streaming source flow provided from a singular source device. A decoder is operative to decode the single streaming source flow thereby generating at least one decoded signal that is provided to at least two respective encoders implemented for generating at least two respective streaming delivery flows that may be provided to one or more destination devices. As can be seen with respect to this diagram, a given received streaming source flow may undergo transcoding in accordance with at least two different operational modes. For example, this diagram illustrates that at least two different respective encoders may be implemented for generating two or more different respective streaming delivery flows that may be provided to one or more destination devices.

Figure 17:
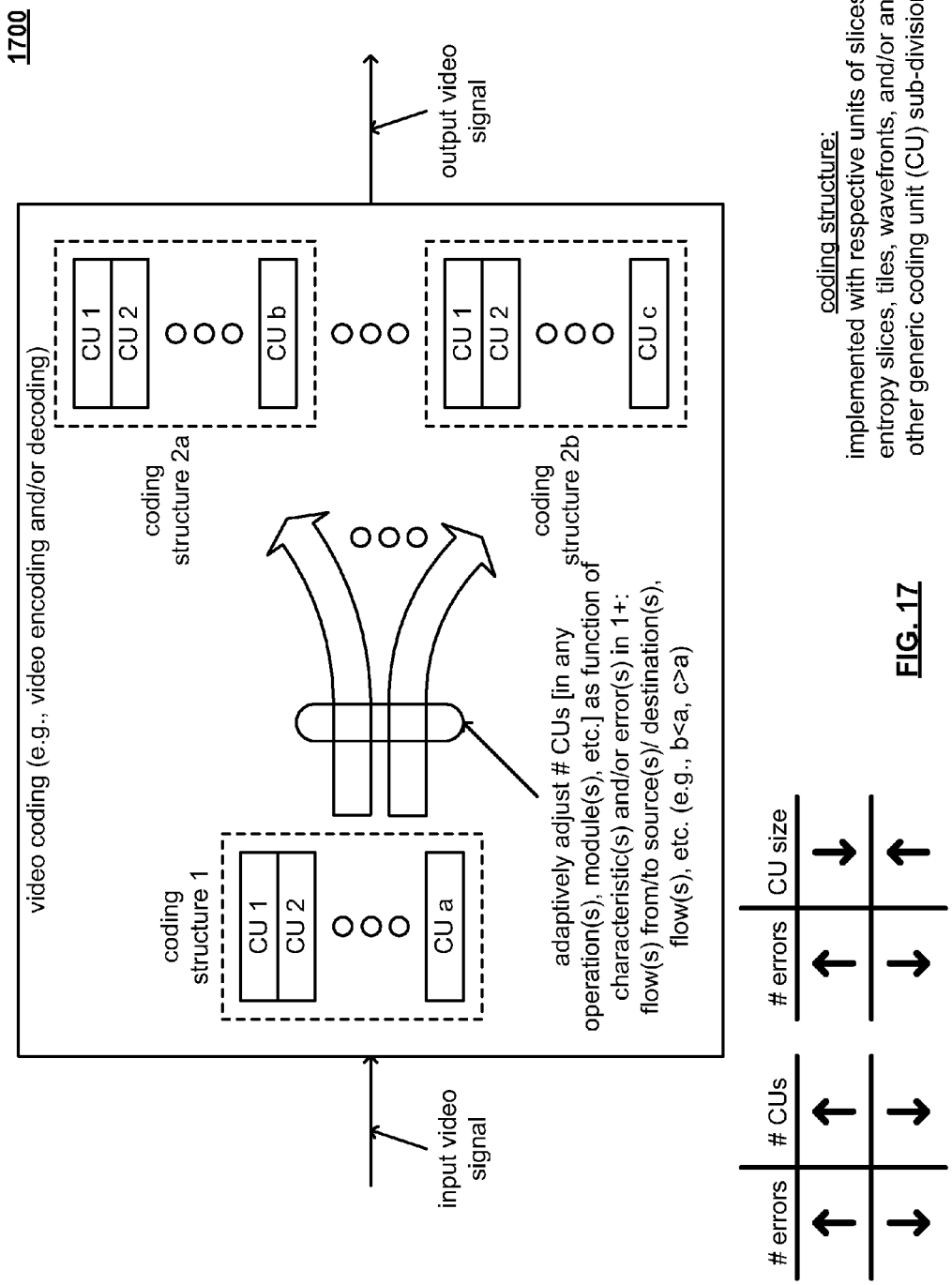
FIG. 17 illustrates an embodiment of adaptive coding structure adjustment based on any of a number of considerations.

FIG. 17 illustrates an embodiment 1700 of adaptive coding structure adjustment based on any of a number of considerations. As may be understood with respect to video coding, a number of processes and operations therein operate using respective coding units (CUs) (e.g., corresponding to the coding structure, each CU having a corresponding size such that all CUs of a given coding structure are the same or different respective CUs of a coding structure having different respective sizes, and generally different coding structures having CUs such that at least one CU in one of the respective coding structures being different than at least one other CU in at least one other of the respective coding structures) corresponding to a video signal. For example, entirely different coding structures may respectively have CUs of different size (e.g., first coding structure having CUs of a first size, second coding structure having CUs of a second size, and so on). Alternatively, a given coding structure may have different respective CUs therein respectively having different CU sizes (e.g., a first CU or group of CUs having a first size, a second CU or group of CUs having a second size, and so on). Adaptation between and among various coding structures and/or between and among various CU sizes within one or more coding structures may be made in accordance with in accordance with various aspects, and their equivalents, of the invention.

As may be understood herein, the particular parsing and/or partitioning of a video signal into different respective CUs in accordance with a given coding structure may be effectuated any of a number of different ways (e.g., including employing CUs using slices, entropy slices, tiles, wavefronts, etc. and/or any other generic CU sub-division). Generally speaking, such parsing and/or partitioning of a video signal may be made in accordance with any generic CU sub-division without departing from the scope and spirit of the invention.

Often times, the particular size and/or number of CUs employed for processing pictures or frames of a particular size is fixed. However, adaptation may be performed to adjust the number of CUs and/or their respective size as a function of any of a number of the various characteristics described herein. Generally speaking, there are at least four different general approaches which may be employed with respect to addressing errors of signals, carrying video content, communicated within a communication system. These include 1) (NACK—negative ACK) resend processing; 2) employ more significant error resilience coding ("ERC"); 3) error concealment ("EC"); or 4) reduce the impact of error by limiting inter and intra frame referencing. Depending on the circumstances, resend processing may be employed and suitable in some cases. However, there are certain situations in which such resend processing is not possible given latency demands, multicasting environments, queue insufficiencies, shared network loading, etc. Also, different respective degrees of resilience coding overhead (e.g., such as those employed in accordance with error correction code (ECC), forward error correction (FEC), etc. that typically introduce redundancy) may not be suitable or justified for all circumstances.

Moreover, such approaches may not be compliant or supported by a given video coding standard or protocol. For example, error concealment may involve an approach that yields acceptable or unacceptable results depending on the circumstances and may place excessive demand on a given decoding device. However, the relatively large overhead which may be associated with achieving such operation may not be acceptable or suitable in certain embodiments (e.g., the communication system may not be able to support that will amount of overhead given its throughput, latency, etc.). Moreover, certain video coding standards may make firm, fixed selections regarding approaches for various types of resilience coding and error concealment while keeping an eye toward the possibility of problems that may be associated with resend processing and placing limits on inter- and intra-frame referencing. As a result, certain conventional standards may perform with too much bit rate overhead in some environments and be inadequate for certain applications.

As mentioned above, adaptation between a number of CUs and/or the respective sizes of CUs may be modified in accordance with a number of considerations. In addition, auto selection and adaptation between the respective at least four different general approaches described above [e.g., 1) (NACK—negative ACK) resend processing; 2) employ more significant error resilience coding ("ERC"); 3) error concealment ("EC"); or 4) reduce the impact of error by limiting inter and intra frame referencing] may also be made based upon such considerations, including local and/or remote considerations (e.g., including characteristics associated with a source device and/or middling device from which media may be provided). Analogous to other certain embodiments, initial selection may be made and adaptation thereafter based upon any changes that may be detected within the overall communication system. Such adaptation of these at least four different general approaches may occur gradually and independently with respect to each other. That is to say, adaptability of each individual approach may be made independently. In other situations, all of them are adjusted as a group such as in accordance with a profile-like approach.

Moreover, within this embodiment as well as with others, it is also noted that such consideration which may drive adaptability may be based not only on a number of errors which may be determined, but on the particular type of errors that may be determined (e.g., including those associated with burst noise, erasures, inter-symbol interference, and/or other different types of errors, etc.). Also, both spatial and temporal approaches may be applied for error concealment. Generally speaking, spatial concealment operates to average neighboring pixels in accordance with generating a value for a missing pixel or pixel region, and temporal concealment operates either to use prior and/or subsequent frames' pixel counterparts or an interpolation based thereon or there between. If desired, both of these respective error concealment approaches may be employed in accordance with some blended or weighted implementation. For example, in some instances, spatial concealment would be weighted greater than temporal concealment; in others situations, temporal concealment could be weighted greater than spatial concealment. Moreover, by comparing the relative variance between these two types of error concealment, determination based upon which form of error concealment is more appropriate may be made.

Figure 18:
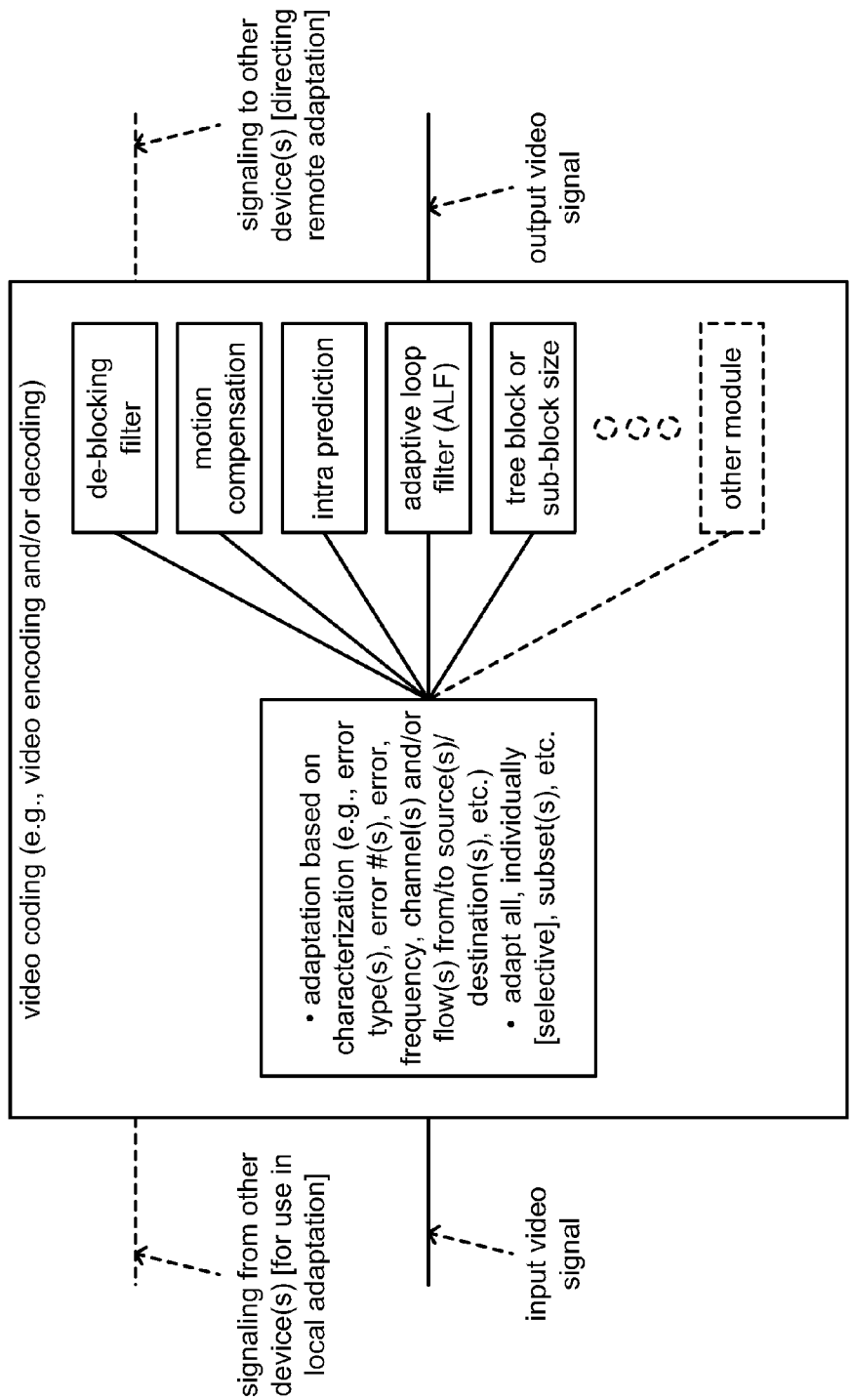
FIG. 18 illustrates an embodiment of adaptive video coding operation based on any of a number of considerations.

FIG. 18 illustrates an embodiment 1800 of adaptive video coding operation based on any of a number of considerations. This diagram shows such adaptation as may be made with respect to different exemplary operations and/or processes associated with video coding. For example, adaptation with respect to any one of the circuitries, blocks, modules, etc. may be made based upon any one or more of the respective characterizations as described herein, including those which may be local based and/or those which may be remote based. For example, adaptation may be made with respect to de-blocking filter, motion compensation, intra-prediction, adaptive loop filter (ALF), tree block or sub-block size and/or depth, and/or any other circuitry, block, module, etc. Again, such remote based considerations may be made with respect to input and output signals actually received by a given device; such as an input video signal received by a device and/or an output video signal transmitted from device. Alternatively, different types of signaling including control information, feedback, etc. may be provided from any other devices within the overall system.

Figure 19:
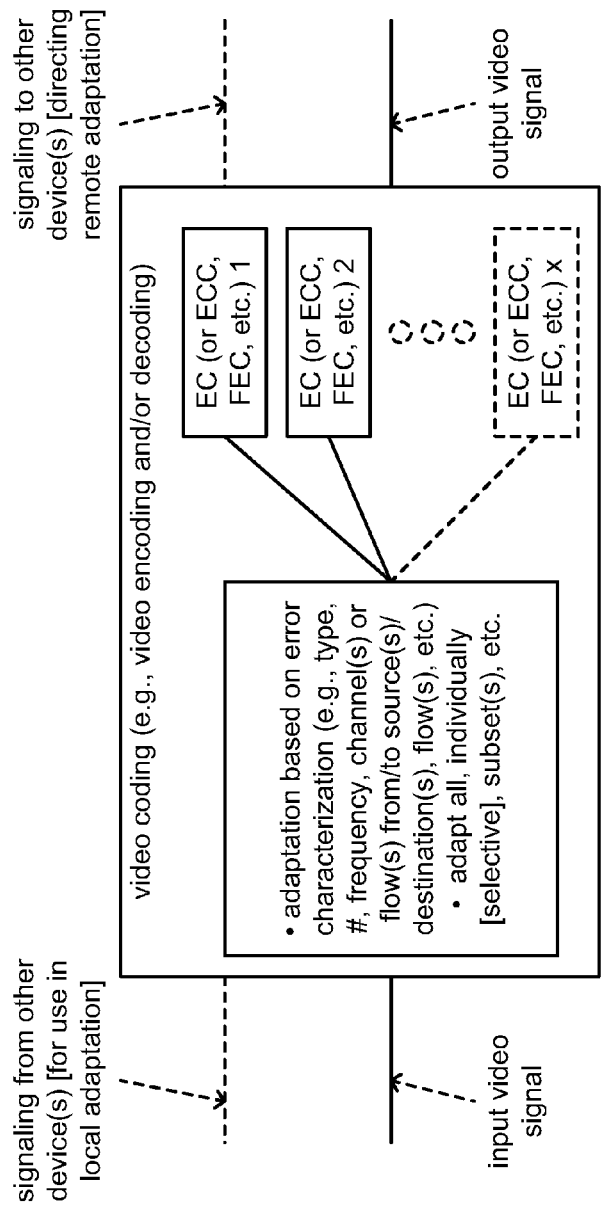
FIG. 19 illustrates an embodiment of adaptive error concealment operation based on any of a number of considerations.

FIG. 19 illustrates an embodiment 1900 of adaptive error concealment operation based on any of a number of considerations. As can be seen with respect to this diagram, adaptation between and among different types of error concealment (EC) (or ECC, FEC, etc.) may be made based upon any one or more of the respective characterizations as described herein, including those which may be local based and/or those which may be remote based.

Figure 20:
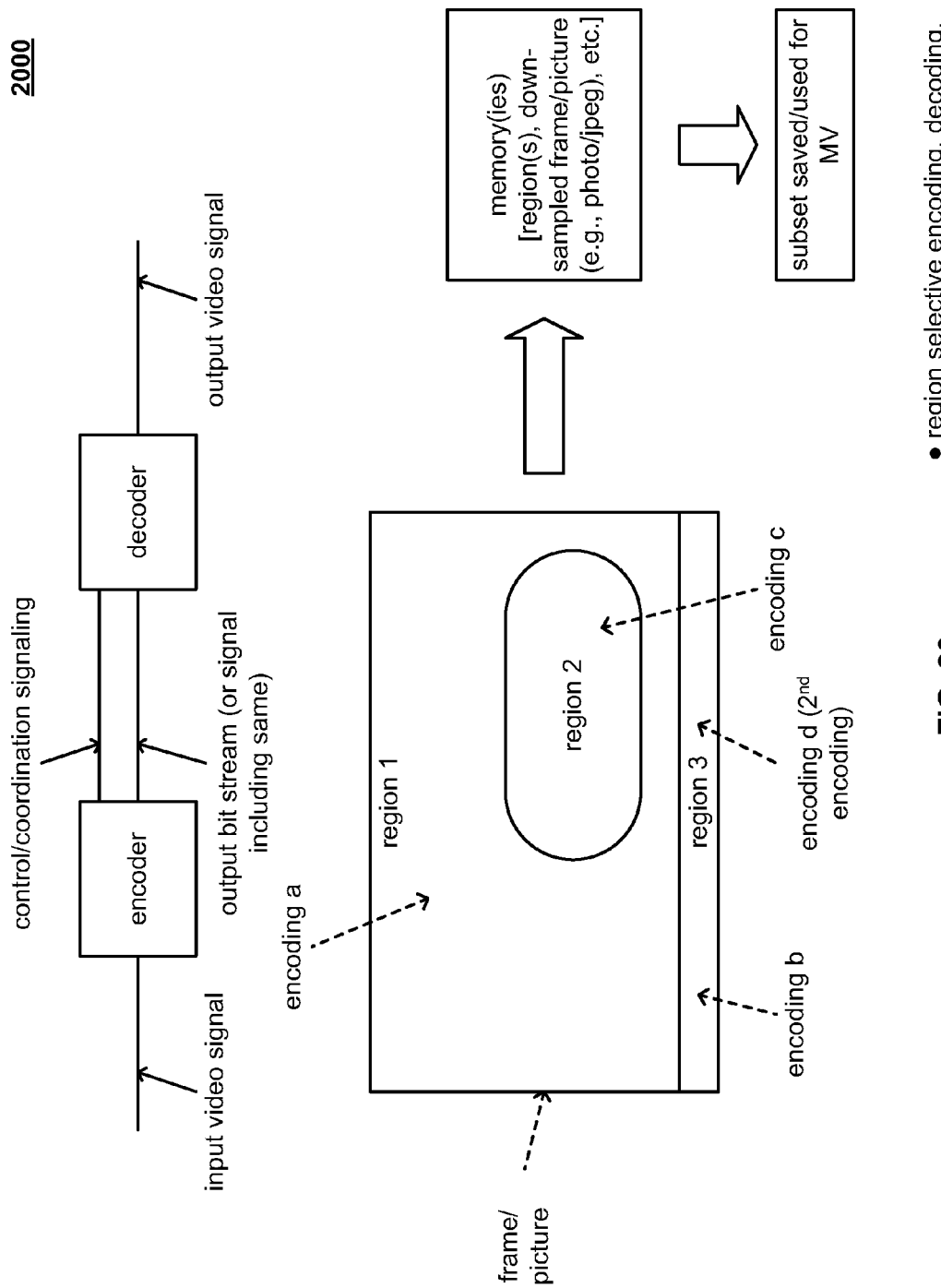
FIG. 20 illustrates an embodiment of employing at least one subset of a frame or picture (and/or down sampled portion thereof), in conjunction with coordination between encoder and decoder, for use in video coding including motion vector calculation.

FIG. 20 illustrates an embodiment 2000 of employing at least one subset of a frame or picture (and/or down sampled portion thereof), in conjunction with coordination between encoder and decoder, for use in video coding including motion vector calculation. As can be seen with respect to this diagram, different respective regions of a picture frame may be handled differently. For example, a given video signal may have certain properties and/or characteristics (e.g., some portions of frames or pictures within a video signal may have properties and/or characteristics different than other portions of frames or pictures within the very same video signal, such as indicating a greater amount of movement [e.g., a background may have less relative movement than the face of an individual speaking]). That is to say, at the encoder side, video encoding may be selectively applied to different respective regions of a frame or picture based on any of a number of such considerations (e.g., including any one or more of characteristics of an input video signal itself [e.g., such as raw video or that which is received from a transcoder device or middling device], one or more upstream characteristics [e.g., such as related to one or more source devices and/or one or more networks via which a video signal is transmitted through and received from], one or more downstream characteristics [e.g., such as related to one or more destination devices and/or one or more networks via which a video signal is transmitted through and provided to], and/or one or more local operation characteristics [e.g., available processing resources, available memory, source flow(s) being received, delivery flow(s) being transmitted, etc.]). These different respective regions may have different respective characteristics such that they may be processed at the decoder side and handled differently. That is to say, characteristics associated with different regions of the picture frame may be more adaptable and appropriately suited to respective types of error concealment.

In addition, by performing such processing in accordance with region selective operations, motion vector determination may be made particularly on a reduced amount of information corresponding to a given frame or picture. That is to say, a particular region of a frame or picture may be appropriately selected for use in motion vector calculation. That is to say, by restricting the particular region of a frame or picture to be searched and used for motion vector calculation, such processing may be performed faster and more quickly than when the entirety of a given frame or picture is considered. Alternatively, a down sampled portion of a frame or picture may be used for such motion vector calculation. Again, by utilizing a relatively reduced amount of information for use in motion vector calculation, such processing may be performed faster and more quickly.

As may be understood with respect to such operations performed using less than all of the available information, there may be some degradation in quality. However, if appropriately implemented, such effects may not even be perceptual, in that, a user may not even perceive any such degradation in quality.

It is also noted that coordination should be effectuated between encoder device and the decoder device when such alternative implementations are performed, in that, a decoder device would need to know the type and manner of operations that have been performed by the encoder so that they may be appropriately handled.

Generally speaking, in certain embodiments, as opposed to performing full conventional inter-prediction or intra-prediction as suggested by an industry or proprietary video coding standard protocol, a relatively lower complexity approach is contemplated. Such an approach may involve regional restriction with or without assistance from a supplemental private (proprietary) channel or a standardized supplemental information exchange. Some approaches involve an encoder/transcoder placing self-imposed internal limitations on such processes. Some such limitations may be hidden from the decoder while others might involve either standardized or proprietary supplemental communication between the encoder and decoder in support. Lastly, yet other approaches might involve delivering proprietary channel assistance via private channel exchanges between the transcoder/encoder and decoder. Complexity reduction is experienced in the form of processing, throughput, and/or buffering reductions—trading off compression for underlying infrastructure constraints associated most dramatically with streaming.

In one possible embodiment implemented in accordance with complexity reduction techniques, only intra-predict is performed with no inter-prediction attempts, or vice versa. As may be understood with respect to the regional selective operations described herein, the respective search areas for such prediction may be limited. Such limiting may be with respect to a given portion of the very same frame or picture in accordance with intra-prediction. Alternatively, such limiting may be with respect to a given portion of one or more other frames or pictures in accordance with intra-prediction, as may be understood, a reduced complexity inter-prediction with assistance from intra-prediction processing or vice versa. For example, preliminary intra-prediction results can be used to provide a starting point or a reduced search region in which inter-prediction is performed.

FIG. 21A, FIG. 21B, FIG. 22A, and FIG. 22B illustrate various embodiments of methods for processing of one or more video signals.

Referring to method 2100 of FIG. 21A, the method 2100 begins by receiving a first video signal from at least one source device we at least one communication network, as shown in a block 2110. The method 2100 continues by processing the first video signal in accordance with the least one of a number of a plurality of CUs in accordance with a coding structure per video signal portion and a size of the plurality of CUs thereby generating a second video signal, as shown in a block 2120.

As may be understood with respect to video coding, a number of processes and operations therein operate using respective coding units (CUs) (e.g., corresponding to the coding structure, each CU having a corresponding size such that all CUs of a given coding structure are the same or different respective CUs of a coding structure having different respective sizes, and generally different coding structures having CUs such that at least one CU in one of the respective coding structures being different than at least one other CU in at least one other of the respective coding structures) corresponding to a video signal. For example, entirely different coding structures may respectively have CUs of different size (e.g., first coding structure having CUs of a first size, second coding structure having CUs of a second size, and so on). Alternatively, a given coding structure may have different respective CUs therein respectively having different CU sizes (e.g., a first CU or group of CUs having a first size, a second CU or group of CUs having a second size, and so on). Adaptation between and among various coding structures and/or between and among various CU sizes within one or more coding structures may be made in accordance with in accordance with various aspects, and their equivalents, of the invention.

As may be understood herein, the particular parsing and/or partitioning of a video signal into different respective CUs in accordance with a given coding structure may be effectuated any of a number of different ways (e.g., including employing CUs using slices, entropy slices, tiles, wavefronts, etc. and/or any other generic CU sub-division). Generally speaking, such parsing and/or partitioning of a video signal may be made in accordance with any generic CU sub-division without departing from the scope and spirit of the invention.

Then, based on any of a number of considerations, the method 2100 operates by adaptively modifying at least one of the number of the plurality of CUs per video signal portion and the size of the plurality of CUs, as shown in a block 2130. As may be understood, there may be some instances in which the overall number of CUs is modified such that the respective sizes of those CUs is also modified so that the overall amount of information included within each of the number of CUs and respective sizes of those CUs before and after adaptation is the same.

In other instances, the overall number of CUs is modified without change to the respective sizes of those CUs, and an even other instances, the respective sizes of those CUs are modified without changing the respective number of CUs. Generally speaking, adaptation may be made with respect to either one or both of the number of CUs and the respective sizes of the CUs based on any number of considerations. Some examples of such considerations include at least one error incurred or associated with generating the second video signal, at least one characteristic associated with at least one of an upstream flow, downstream flow, source device, and the destination device. For example, many examples are provided herein as related to characteristics associated with respective devices, flows, communication links, communication networks, etc. as may be encountered within various implementations, embodiments, etc. The method 2100 continues by outputting the second video signal, as shown in a block 2140.

Referring to method 2101 of FIG. 21B, the method 2101 begins by encoding a first video signal in accordance with the least one of a number of a plurality of CUs per video signal portion and a size of the plurality of CUs thereby generating a second video signal, shown in a block 2111. Then, based on any of a number of considerations, the method 2101 operates by adaptively modifying at least one of the number of the plurality of CUs per video signal portion and the size of the plurality of CUs, as shown in a block 2121. As may be understood, there may be some instances in which the overall number of CUs is modified such that the respective sizes of those CUs is also modified so that the overall amount of information included within each of the number of CUs and respective sizes of those CUs before and after adaptation is the same. Any such considerations, including those described with respect to the previous method 2100, etc., among others, may be employed for use and directing such adaptive modification of one or more operational parameters employed for generating the second video signal. The method 2101 continues by outputting the second video signal, as shown in a block 2131.

Referring to method 2200 of FIG. 22A, the method 2200 begins by receiving a first video signal from at least one source device be at least one communication network, as shown in a block 2210. The method 2200 also operates by decoding the first video signal in accordance with the least one of a number of a plurality of CUs per video signal portion and a size of the plurality of CUs thereby generating a second video signal, shown in a block 2220. Then, based on any of a number of considerations, the method 2200 operates by adaptively modifying at least one of the number of the plurality of CUs per video signal portion and the size of the plurality of CUs, as shown in a block 2230. Any such considerations, including those described with respect to the previous method 2100, 2101, etc., among others, may be employed for use and directing such adaptive modification of one or more operational parameters employed for generating the second video signal.

Referring to method 2201 of FIG. 22B, the method 2201 begins by processing the first video signal in accordance with at least one of a number of a plurality of CUs per video signal portion and a size of the plurality of CUs thereby generating a second video signal, as shown in a block 2211. As shown in a decision block 2231, it is determined whether or not at least one characteristic and/or at least one error associated with generating the second video signal compares favorably with the least one threshold, as shown in the decision block 2231. As may be understood, different respective characteristics and/or different respective air wars may be compared respectively two different respective thresholds in the decision block 2231. For example, a first characteristic may be compared with a first threshold, second characteristic may be compared with the second result, etc. Also, any one characteristic may be compared to more than one respective threshold, such as with respect to hysteresis type considerations (e.g., such as comparing to an upper threshold and/or a lower threshold).

Then, based on any of a number of considerations, the method 2201 operates by adaptively modifying at least one of the number of the plurality of CUs per video signal portion and the size of the plurality of CUs, as shown in a block 2241. Any such considerations, including those described with respect to the previous method 2100, 2101, 2200, etc., among others, may be employed for use and directing such adaptive modification of one or more operational parameters employed for generating the second video signal.

It is also noted that the various operations and functions as described with respect to various methods herein may be performed within a communication device, such as using a baseband processing module and/or a processing module implemented therein and/or other component(s) therein.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/ or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While such circuitries in the above described figure(s) may including transistors, such as field effect transistors (FETs), as one of ordinary skill in the art will appreciate, such transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A communication device comprising:
   a communication interface configured to:
      receive a first video signal, having a plurality of characteristics, from a source device via at least one streaming media source flow via at least one communication network; and
      output a second video signal to a destination device via at least one streaming media delivery flow via the at least one communication network; and
   a video processor configured to process the first video signal to generate the second video signal including to:
      select a first per unit size for a first plurality of coding units (CUs) and a second per unit size, which is different than the first per unit size, for a second plurality of CUs based on feedback or control information received from at least one of the source device or the destination device;
      perform a first processing operation when processing the first signal to generate the second video signal using the first plurality of CUs; and
      perform a second processing operation, which is different than the first processing operation, when processing the first signal to generate the second video signal using the second plurality of CUs, wherein the first processing operation and the second processing operation are selected from a set of video processing operations that includes transform and quantization, inverse transform and inverse quantization, intra-prediction, inter-prediction, motion compensation, de-blocking filtering, motion estimation, entropy encoding, entropy decoding, and ALF processing;

select at least one of the first per unit size of the first plurality of CUs or the second per unit size of the second plurality of CUs based on:

at least one of first feedback or first control information received from the destination device that includes at least one of a negative acknowledgement (NACK) that requests resend of at least one video signal, a first instruction to modify error resilience coding (ERC) when generating the second video signal, a second instruction to modify error concealment (EC) when generating the second video signal, or a third instruction to modify at least one of inter-frame or intra-frame referencing when generating the second video signal, wherein the at least one of the first feedback or the first control information received from the destination device also includes at least one characteristic associated with the at least one streaming media delivery flow being at least one characteristic associated with at least one streaming media delivery flow corresponds to at least one of latency, delay, noise, distortion, crosstalk, attenuation, SNR, capacity, bandwidth, frequency spectrum, bit rate, or symbol rate associated with the at least one streaming media delivery flow; and at least one of second feedback or second control information received from the source device that includes at least one characteristic associated with the at least one streaming media source flow corresponds to at least one of latency, delay, noise, distortion, crosstalk, attenuation, SNR, capacity, bandwidth, frequency spectrum, bit rate, or symbol rate associated with the at least one streaming media source flow.

2. The communication device of claim 1 further comprising:
a middling communication device implemented within the at least one communication network between the source device and the destination device.

3. The communication device of claim 1, wherein the at least one of the second feedback or the second control information received from the source device that also includes at least one characteristic associated with the at least one streaming media source flow that corresponds to at least one of user usage information, processing history, queuing, an energy constraint, a display size, a display resolution, a display history, or a plurality of display regions associated with the source device.

4. The communication device of claim 1 further comprising:
the communication device is operative within at least one of a satellite communication system, a wireless communication system, a wired communication system, a fiber-optic communication system, or a mobile communication system.

5. A communication device comprising:
a communication interface configured to:
receive a first video signal having a plurality of characteristics from a source device via at least one streaming media source flow via at least one communication network; and
output a second video signal to a destination device via at least one streaming media delivery flow via the at least one communication network; and a video processor configured to process the first video signal to generate the second video signal including to:
perform a first processing operation when processing the first signal to generate the second video signal using a first plurality of coding units (CUs) each having a first per unit size; and
perform a second processing operation, which is different than the first processing operation, when processing the first signal to generate the second video signal using a second plurality of CUs each having a second per unit size that is different than the first per unit size, wherein the first processing operation and the second processing operation are selected from a set of video processing operations that includes transform and quantization, inverse transform and inverse quantization, intra-prediction, inter-prediction, motion compensation, de-blocking filtering, motion estimation, entropy encoding, entropy decoding, and ALF processing;

select at least one of the first per unit size of the first plurality of CUs or the second per unit size of the second plurality of CUs based on:

at least one of first feedback or first control information received from the destination device that includes at least one of a negative acknowledgement (NACK) that requests resend of at least one video signal, a first instruction to modify error resilience coding (ERC) when generating the second video signal, a second instruction to modify error concealment (EC) when generating the second video signal, or a third instruction to modify at least one of inter-frame or intra-frame referencing when generating the second video signal, wherein the at least one of the first feedback or the first control information received from the destination device also includes at least one characteristic associated with the at least one streaming media delivery flow being at least one characteristic associated with at least one streaming media delivery flow corresponds to at least one of latency, delay, noise, distortion, crosstalk, attenuation, SNR, capacity, bandwidth, frequency spectrum, bit rate, or symbol rate associated with the at least one streaming media delivery flow; and at least one of second feedback or second control information received from the source device that includes at least one characteristic associated with the at least one streaming media source flow corresponds to at least one of latency, delay, noise, distortion, crosstalk, attenuation, SNR, capacity, bandwidth, frequency spectrum, bit rate, or symbol rate associated with the at least one streaming media source flow.

6. The communication device of claim 5, wherein the video processor is further configured to:
process the first video signal to generate a third video signal using a third plurality of CUs each having a third per unit size, wherein the third per unit size is different than the first per unit size and the second per unit size.

7. The communication device of claim 5 further comprising:
a middling communication device implemented within the at least one communication network between the source device and the destination device.

8. The communication device of claim 5, wherein the video processor is further configured to select at least one of the first per unit size of the first plurality of CUs or the second per unit size of the second plurality of CUs based on at least one characteristic associated with the at least one streaming media delivery flow associated with the destination device that corresponds to at least one of user usage information, processing history, queuing, an energy constraint, a display size, a display resolution, a display history, or a plurality of display regions associated with the destination device.

9. The communication device of claim 5 further comprising:
a transcoder device implemented within the at least one communication network between the source device and the destination device.

10. The communication device of claim 5, wherein the video processor is further configured to select at least one of the first per unit size of the first plurality of CUs or the second per unit size of the second plurality of CUs based on en at least one characteristic associated with the at least one streaming media source flow associated with the source device that corresponds to at least one of user usage information, processing history, queuing, an energy constraint, a display size, a display resolution, a display history, or a plurality of display regions associated with the source device.

11. The communication device of claim 5, wherein the video processor is further configured to:
process the first video signal to generate a third video signal using a third plurality of CUs each having a third per unit size, wherein the third per unit size is different than the first per unit size and the second per unit size; and
process the first video signal to generate a fourth video signal using a fourth plurality of CUs each having a fourth per unit size, wherein the fourth per unit size is different than the first per unit size, the second per unit size, and the third per unit size.

12. The communication device of claim 5 further comprising:
the communication device is operative within at least one of a satellite communication system, a wireless communication system, a wired communication system, a fiber-optic communication system, or a mobile communication system.

13. A method for execution by a communication device, the method comprising:
via a communication interface of the communication device, receiving a first video signal having a plurality of characteristics from a source device via at least one streaming media source flow via at least one communication network;
performing a first processing operation when processing the first signal to generate a second video signal using a first plurality of coding units (CUs) each having a first per unit size;
performing a second processing operation, which is different than the first processing operation, when processing the first signal to generate the second video signal using a second plurality of CUs each having a second per unit size that is different than the first per unit size, wherein the first processing operation and the second processing operation are selected from a set of video processing operations that includes transform and quantization, inverse transform and inverse quantization, intra-prediction, inter-prediction, motion compensation, de-blocking filtering, motion estimation, entropy encoding, entropy decoding, and ALF processing;
via the communication interface of the communication device, outputting the second video signal to a destination device via the at least one streaming media delivery flow via at least one communication network; and selecting at least one of the first per unit size of the first plurality of CUs or the second per unit size of the second plurality of CUs based on:
at least one of first feedback or first control information received from the destination device that includes at least one of a negative acknowledgement (NACK) that requests resend of at least one video signal, a first instruction to modify error resilience coding (ERC) when generating the second video signal, a second instruction to modify error concealment (EC) when generating the second video signal, or a third instruction to modify at least one of inter-frame or intra-frame referencing when generating the second video signal, wherein the at least one of the first feedback or the first control information received from the destination device also includes at least one characteristic associated with the at least one streaming media delivery flow being at least one characteristic associated with at least one streaming media delivery flow corresponds to at least one of latency, delay, noise, distortion, crosstalk, attenuation, SNR, capacity, bandwidth, frequency spectrum, bit rate, or symbol rate associated with the at least one streaming media delivery flow; and
at least one of second feedback or second control information received from the source device that includes at least one characteristic associated with the at least one streaming media source flow corresponds to at least one of latency, delay, noise, distortion, crosstalk, attenuation, SNR, capacity, bandwidth, frequency spectrum, bit rate, or symbol rate associated with the at least one streaming media source flow.

14. The method of claim 13 further comprising:
processing the first video signal to generate a third video signal using a third plurality of CUs each having a third per unit size, wherein the third per unit size is different than the first per unit size and the second per unit size.

15. The method of claim 13, wherein the communication device comprises:
a middling communication device implemented within the at least one communication network between the source device and the destination device.

16. The method of claim 13 further comprising selecting at least one of the first per unit size of the first plurality of CUs or the second per unit size of the second plurality of CUs based on at least one communication network, wherein the at least one characteristic associated with the at least one streaming media delivery flow associated with the destination device that corresponds to at least one of user usage information, processing history, queuing, an energy constraint, a display size, a display resolution, a display history, or a plurality of display regions associated with the destination device.

17. The method of claim 13, wherein the communication device comprises:
a transcoder device implemented within the at least one communication network between the source device and the destination device.

18. The method of claim 13 further comprising selecting at least one of the first per unit size of the first plurality of CUs or the second per unit size of the second plurality of CUs based on at least one characteristic associated with the at least one streaming media source flow corresponds to at least one of user usage information, processing history, queuing, an energy constraint, a display size, a display resolution, a display history, or a plurality of display regions associated with the source device.

19. The method of claim 13 further comprising:
processing the first video signal to generate a third video signal using a third plurality of CUs each having a third per unit size, wherein the third per unit size is different than the first per unit size and the second per unit size; and processing the first video signal to generate a fourth video signal using a fourth plurality of CUs each having a fourth per unit size, wherein the fourth per unit size is different than the first per unit size, the second per unit size, and the third per unit size.

20. The method of claim 13, wherein the communication device is operative within at least one of a satellite communication system, a wireless communication system, a wired communication system, a fiber-optic communication system, or a mobile communication system.

* * * * *